(12) United States Patent
Kim et al.

(10) Patent No.: US 8,638,860 B2
(45) Date of Patent: Jan. 28, 2014

(54) DIGITAL TELEVISION TRANSMISSION AND RECEIVING APPARATUS AND METHOD USING 1/4 RATE CODED ROBUST DATA

(75) Inventors: Sung-Hoon Kim, Daejeon (KR); Kum-Ran Ji, Jeollanam-do (KR); Jae-Young Lee, Seoul (KR); Seung-Won Kim, Fairfax, VA (US); Soo-In Lee, Daejeon (KR); Chieteuk Ahn, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1041 days.

(21) Appl. No.: 11/575,242

(22) PCT Filed: Sep. 15, 2005

(86) PCT No.: PCT/KR2005/003073
§ 371 (c)(1),
(2), (4) Date: Mar. 12, 2009

(87) PCT Pub. No.: WO2006/031077
PCT Pub. Date: Mar. 23, 2006

(65) Prior Publication Data
US 2009/0201997 A1     Aug. 13, 2009

(30) Foreign Application Priority Data
Sep. 15, 2004   (KR) ................. 10-2004-0073811

(51) Int. Cl.
*H04N 7/12* (2006.01)
*H04N 11/02* (2006.01)
*H04N 11/04* (2006.01)

(52) U.S. Cl.
USPC ..................................... 375/240.25

(58) Field of Classification Search
USPC ..................................... 375/240.25
See application file for complete search history.

(56) References Cited

U.S. PATENT DOCUMENTS 7,020,828 B2 *   3/2006   Birru ........................... 714/792
2001/0055342 A1 *   12/2001   Fimoff ..................... 375/240.26
(Continued)

FOREIGN PATENT DOCUMENTS

| CN | 1230078 A | 9/1999 |
| CN | 1505351 A | 6/2004 |

(Continued)

OTHER PUBLICATIONS

Vasanth R, Gaddam, et al; "A Newly Proposed ATSC DTV System for Transmitting a Robust Bit-stream along with the Standard Bit-stream", IEEE Transactions on Consumer Electronics, vol. 49, Issue 4; pp. 933-938, Nov. 2003.

*Primary Examiner* — Chikaodili E Anyikire
(74) *Attorney, Agent, or Firm* — Ladas & Parry LLP

(57) ABSTRACT

Provided is a Vestigial Side Band Digital Television (DTV) transmitter/receiver based on Advanced Television System Committee A/53. The invention provides DTV transmitter/receiver having a dual stream structure through generation of robust data which has a transmission rate a fourth as fast as that of normal data, and a method thereof. The DTV transmitter includes: input means for receiving digital video data stream including normal and robust data; encoding means for performing 1/4 rate coding on the digital video data stream so that one bit can be transmitted through two symbols; and transmitting means for modulating/transmitting output signals of the encoding means. This invention can reduce SNR and satisfy TOV of robust data by performing additional FEC on robust data, transmitting/receiving 1/4 rate coded robust data, which are capable of transmitting one-bit data for two symbols, and improving decoding ability of an equalizer and a trellis decoder of a DTV receiver.

32 Claims, 30 Drawing Sheets

(56) References Cited

U.S. PATENT DOCUMENTS

| | | |
|---|---|---|
| 2002/0019470 A1 | 2/2002 | Ammon, Jr. |
| 2002/0191712 A1* | 12/2002 | Gaddam et al. ............... 375/301 |
| 2002/0194570 A1 | 12/2002 | Birru et al. |
| 2003/0035468 A1 | 2/2003 | Corbaton et al. |
| 2003/0079173 A1* | 4/2003 | Birru ............................ 714/792 |
| 2004/0083417 A1 | 4/2004 | Lane et al. |
| 2008/0092012 A1* | 4/2008 | Bretl et al. .................... 714/756 |

FOREIGN PATENT DOCUMENTS

| | | |
|---|---|---|
| CN | 101040522 B | 9/2007 |
| KR | 1020040063779 A | 7/2004 |
| KR | 1020050097435 A | 10/2005 |
| WO | 01/54337 A1 | 7/2001 |
| WO | 02/03678 A2 | 1/2002 |
| WO | 02/080559 A2 | 10/2002 |
| WO | 02/100026 A1 | 12/2002 |
| WO | 2004/062283 A1 | 7/2004 |

\* cited by examiner

DIGITAL TELEVISION TRANSMISSION AND RECEIVING APPARATUS AND METHOD USING 1/4 RATE CODED ROBUST DATA

TECHNICAL FIELD

The present invention relates to a Vestigial Side Band (VSB) digital television (DTV) transmitter and receiver based on a DTV standard A/53 of the Advanced Television System Committee (ATSC), and a method thereof. More particularly, it relates to a DTV transmitter and receiver having a double stream structure by generation of robust data having a transmission rate of a fourth as fast as normal data, and a method thereof.

BACKGROUND ART

The standards of the Advanced Television System Committee (ATSC) suggest to use a signal obtained by modulating 12 independent data streams, which are trellis encoded and time-multiplexed, into 10.76 MHz-rate 8-level Vestigial Side Band (VSB) symbol streams to transmit High Definition Television (HDTV) broadcasting through a terrestrial broadcasting channel. The frequency band of the signal is transformed into a frequency band of 6 MHz which corresponds to a standard Very High Frequency (VHF) or Ultrahigh Frequency (UHF) terrestrial television channel. Signals of the corresponding channel are broadcasted at a data rate of 19.39 Mbps. Detailed technology on the ATSC DTV standards and A/53 are available at http://www.atsc.org/.

FIG. 1 is a block diagram showing a conventional DTV transmitter. As shown, data inputted into a transmitter 100 are serial data streams formed of 188-byte Moving Picture Experts Group (MPEG) compatible data packets, each of which includes a synchronous byte and 187-byte payload data. The inputted data are randomized in a data randomizer 101 and each packet is encoded to include 20-byte parity information for forward error correction (FEC), FEC-Reed Solomon (RS) coding, 1/6 data field interleaving, and 2/3 trellis coding.

That is, according to the ATSC standards, the data randomizer 101 performs XOR on the payload data bytes and a pseudo random binary sequence (PRBS) having a maximum length of 16 bits, which is initialized at a starting field of a data field.

In the RS encoder 103 receiving the outputted randomized data, data having a total of 207 bytes are generated for each data segment by adding 20 RS parity bytes for FEC to the 187 bytes.

The randomization and FEC are not performed on synchronous bytes corresponding to a segment synchronous signal among the inputted packet data.

Subsequently, data packets included in consecutive segments of each field are interleaved in a data interleaver 105, and the interleaved data packets are interleaved again and encoded in a trellis encoder 107. The trellis encoder 107 generates a stream of a data symbol expressed in three bits by using two inputted bits. One bit of the inputted two bits is pre-coded and the other bit is 4-state trellis encoded into two bits. The three bits finally outputted are mapped to an 8-level symbol. The trellis encoder 107 includes 12 parallel trellis encoders and precoders to generate 12 interleaved/coded data sequences.

The 8-level symbol are combined in a multiplexer (MUX) 109 with segment and field synchronization bit sequences 117 from a synchronization unit (not shown) to form a transmission data frame. Subsequently, a pilot signal is added in a pilot adder 111. Symbol streams go through VSB suppressed-carrier modulation in a VSB modulator 113. An 8-VSB symbol stream of a baseband is finally converted into a radio frequency (RF) signal in an RF converter 115 and then transmitted.

FIG. 2 is a block diagram describing a conventional DTV receiver 200. As illustrated, a channel for the RF signal transmitted from the transmitter 100 is selected in a tuner 201 of the receiver 200. Then, the RF signal goes through intermediate frequency (IF) filtering in an IF filter and detector 203 and a synchronous frequency is detected. A synchronous (sync) and timing recovery block 215 detects a synchronous signal and recovers a clock signal.

Subsequently, a National Television Systems Committee (NTSC) interference signal is removed from the signal through a comb filter in an NTSC filter 205, and equalized and phase-tracked in an equalizer and phase tracker 207.

An encoded data symbol removed of multi-path interference goes through trellis decoding in a trellis decoder 209. The decoded data symbol is deinterleaved in a data deinterleaver 211. Subsequently, the data symbol is RS decoded in an RS decoder 213 and derandomized in a data derandomizer 217. This way, the MPEG compatible data packet transmitted from the transmitter 100 can be restored.

FIG. 3 is a diagram illustrating a transmission data frame exchanged between the transmitter of FIG. 1 and the receiver of FIG. 2. As illustrated in the drawing, a transmission data frame includes two data fields and each data field is formed of 313 data segments.

The first data segment of each data field is a synchronous signal, i.e., a data field synchronous signal, which includes a training data sequence used in the receiver 200. The other 312 data segments include a 188-byte transport packet and 20-byte data for FEC, individually. Each data segment is formed of data included in a couple of transmission packets due to data interleaving. In other words, the data of each data segment correspond to several transmission packets.

Each data segment is formed of 832 symbols. The first four symbols are binary and they provide data segment synchronization. A data segment synchronous signal corresponds to a synchronous byte, which is the first byte among the 188 bytes of the MPEG compatible data packet. The other 828 symbols correspond to 187 bytes of the MPEG compatible data packet and 20 bytes for FEC. The 828 symbols are transmitted in the form of an 8-level signal, and each symbol is expressed in three bits. Therefore, 2,484 bits (=828 symbols×3 bits/symbol) are transmitted per data segment.

However, transmission signals of a conventional 8-VSB transceiver are distorted in indoor and mobile channel environments due to variable channel and multipath phenomena, and this degrades reception performance of the receiver.

In other words, transmitted data are affected by various channel distortion factors. The channel distortion factors include a multipath phenomenon, frequency offset, phase jitter and the like. To compensate for the signal distortion caused by the channel distortion factors, a training data sequence is transmitted every 24.2 ms, but a change in multipath characteristics and Doppler interference exist even in the time interval of 24.2 ms that the training data sequences are transmitted. Since an equalizer of the receiver does not have a convergence speed fast enough to compensate for the distortion of receiving signals, which occurs by the change in multipath characteristics and the Doppler interference, the receiver cannot perform equalization precisely.

For this reason, the broadcasting program reception performance of 8-VSB DTV broadcast is lower than that of an analog broadcast and reception is impossible in a mobile receiver. Even if reception is possible, there is a problem that a signal-to-noise ratio (SNR) satisfying Threshold of Visibility (TOV) increases.

To solve the problems, International publication Nos. WO 02/080559 and WO 02/100026, and U.S. Patent Publication No. US2002/019470 disclose technology for transmitting robust data to any one among 4-level symbols, e.g., {−7,−5,5,7} or {−7,−3,3,7}, the technology which will be referred to as P-2VSB.

Also, Korean Patent Application No. 2003-0000512 discloses a technology for transmitting robust data to any one of four-level symbols {−7,−1,3,5} or {−5,−3,1,7}, which will be referred as E-4VSB hereafter.

Also, Korean Patent Application No. 2004-0022688 discloses a technology for transmitting robust data to any one of 8-level symbol {−7,−5,−3,−1,1,3,5,7}, which will be referred to as E-8VSB hereafter.

According to the above method, however, the transmission rate of robust data is a half of that of normal data. That is, one symbol transmits one-bit data. Although the transmitted robust data show a better reception performance than normal data, it is still hard to secure data reception in a poor channel environment such as an environment where a user is walking or moving.

DISCLOSURE

Technical Problem

It is, therefore, an object of the present invention, which is developed to resolve the problems, to provide a Digital Television (DTV) transmitter and receiver that can improve decoding performance in an equalizer and a trellis decoder of a receiver and lower the Signal-to-Noise Ratio (SNR) satisfying Threshold of Visibility (TOV) of robust data by performing additional Forward Error Correction (FEC) on the robust data and transmitting one-bit data on two symbols, and a method thereof.

The other objects and advantages of the present invention can be easily recognized by those of ordinary skill in the art of the present invention from the drawing, detailed description, and claims of the present specification.

Technical Solution

In accordance with one aspect of the present invention, there is provided a digital television (DTV) transmitter, which includes: an input means for receiving a digital video data stream including normal data and robust data; an encoding means for performing ¼ rate coding on the digital video data stream so that one bit can be transmitted through two symbols of a first symbol R1 and a second symbol R2; and a transmitting means for modulating and transmitting an output signal of the encoding means.

The encoding means includes a plurality of multiplexers and generates the first symbol R1 and the second symbol R2 sequentially with respect to one-bit robust data by a control bit for multiplexers.

The encoding means performs ¼ rate coding based on a P-2VSB method and maps the first symbol R1 and the second symbol R2 to one symbol of {−7,−5,5,7}, individually.

Also, the encoding means performs ¼ rate coding based on an E-4VSB method and maps the first symbol R1 and the second symbol R2 to one symbol of {−7,−1,3,5}, individually.

Also, the encoding means performs ¼ rate coding based on an E-4VSB method and maps the first symbol R1 and the second symbol R2 to one symbol of {−5,−3,1,7}, individually.

Also, the encoding means performs ¼ rate coding based on an E-4VSB method and maps the first symbol R1 to one symbol of {−7,−1,3,5} and the second symbol R2 to one symbol of {−5,−3,1,7}.

Also, the encoding means performs ¼ rate coding based on an E-4VSB method and maps the first symbol R1 to one symbol of {−5,−3,1,7} and the second symbol R2 to one symbol of {−7,−1,3,5}.

Also, the encoding means performs ¼ rate coding based on a E-8VSB method and maps the first symbol R1 and the second symbol R2 to one symbol of {−7,−5,−3,−1,1,3,5,7}, individually.

The encoding means performs ¼ rate coding by using four registers. The encoding means includes: a robust encoder for coding the one-bit robust data into two-bit data according to the state of two registers D0 and D1; and a trellis encoder for performing standard trellis coding on the two-bit data and outputting the symbols R1 and R2 having one level respectively among predetermined levels expressed in three bits Z2, Z1 and Z0 according to the state of two registers D2 and D3.

Values of the registers D0 and D1 of the robust encoder can be changed when the robust encoder generates the first symbol R1, and the values can be maintained when the robust encoder generates the second symbol R2.

In accordance with another aspect of the present invention, there is provided a DTV receiver, which includes: a receiving means for receiving a transmission signal including normal data and robust data and converting the received transmission signal into a baseband signal; an equalizing means for determining a symbol level of the transmission signal; a trellis decoding means for performing trellis decoding on the symbol whose level has been determined; and a decoding means for outputting a digital video data stream with respect to the trellis decoded signal, wherein the trellis decoding means performs ¼ rate decoding on the robust data so that one bit can be extracted with respect to two symbols of a first symbol R1 and a second symbol R2.

In accordance with another aspect of the present invention, there is provided a DTV transmitting method, which includes the steps of: a) receiving a digital video data stream including normal data and robust data; b) performing ¼ rate coding on the digital video data stream so that one bit is transmitted through two symbols of first and second symbols R1 and R2; and c) modulating and transmitting output signals of the coding step b).

In accordance with another aspect of the present invention, there is provided a DTV receiving method, which includes the steps of: a) receiving a transmission signal including normal data and robust data and converting the received transmission signal into a baseband signal; b) determining a symbol level of the transmission signal, which is called equalization; c) performing trellis decoding on the symbol whose level has been determined; and d) outputting a digital video data stream with respect to the trellis decoded signal, wherein ¼ rate decoding is performed on the robust data in the trellis decoding step c) in such a manner that one bit is extracted for two symbols of a first symbol R1 and a second symbol R2.

Advantageous Effects

As described above, the present invention can reduce a signal-to-noise ratio (SNR) satisfying a Threshold of Visibility (TOV) by performing additional Forward Error Correction (FEC) on robust data and transmitting and receiving ¼-rate-coded robust data to transit one-bit data on two symbols and thus improving decoding performance in an equalizer and a trellis decoder of a receiver.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter. If it is considered that further description on the prior art may blur the points of the present invention, the description will not be provided. Hereinafter, preferred embodiments of the present invention will be described in detail with reference to the accompanying drawings.

Figure 4:
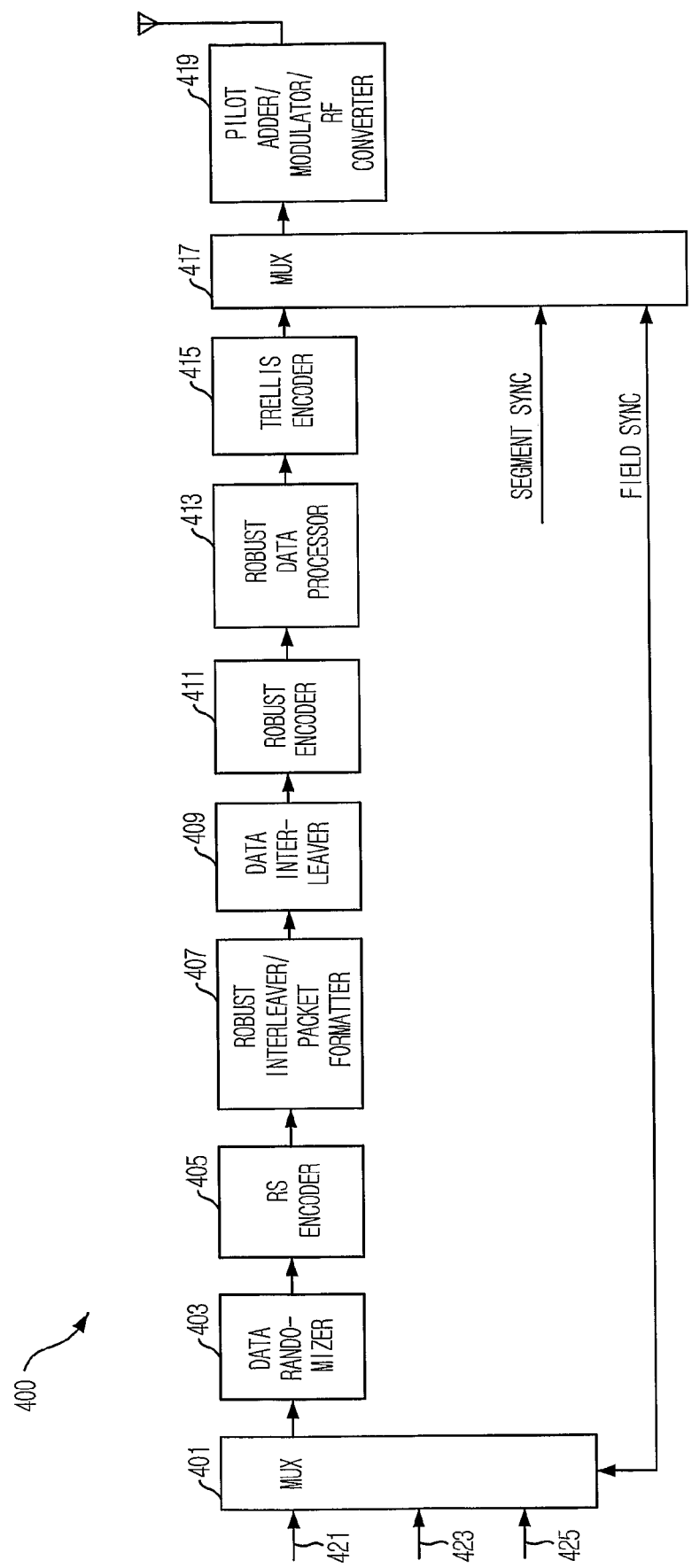
FIG. 4 is a block diagram showing a DTV transmitter in accordance with an embodiment of the present invention.

FIG. 4 is a block diagram showing a Digital Television (DTV) transmitter in accordance with an embodiment of the present invention. As shown, the transmitter 400 includes: a first multiplexer 401, a data randomizer 403, a Reed Solomon (RS) encoder 405, a robust interleaver/packet formatter 407, a data interleaver 409, a robust encoder 411, a robust data processor 413, a trellis encoder 415, a second multiplexer 417, and a pilot adder/modulator/Radio Frequency (RF) converter 419.

Figure 1:
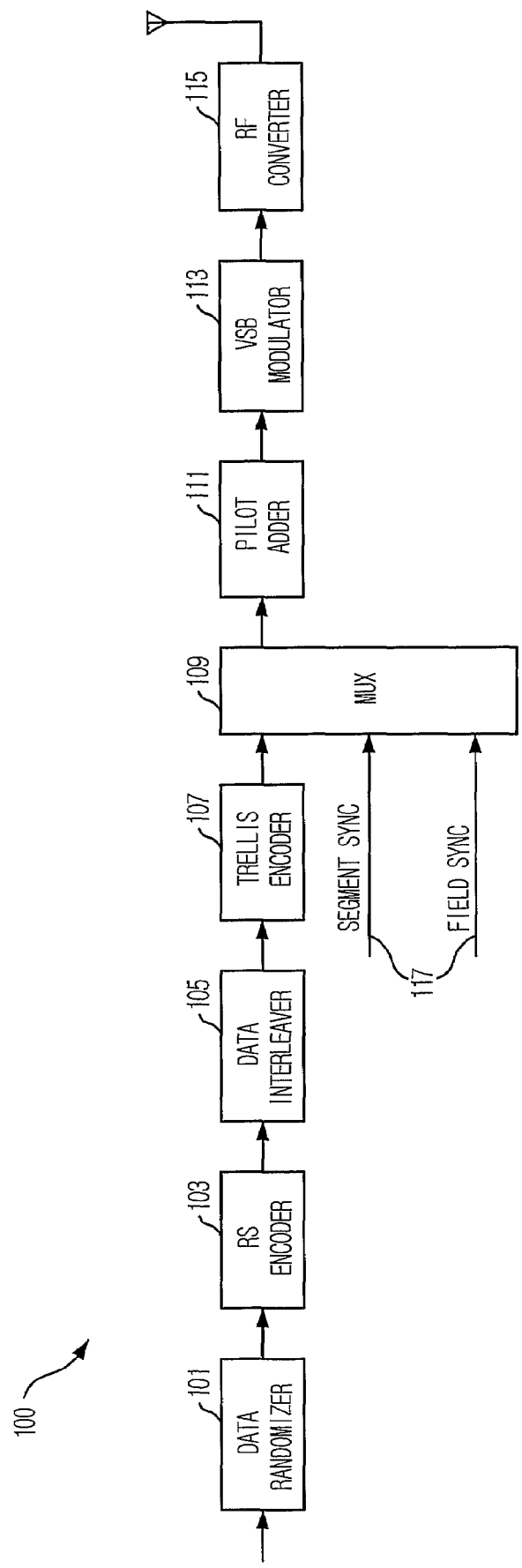
FIG. 1 is a block diagram showing a conventional Digital Television (DTV) transmitter.
Figure 2:
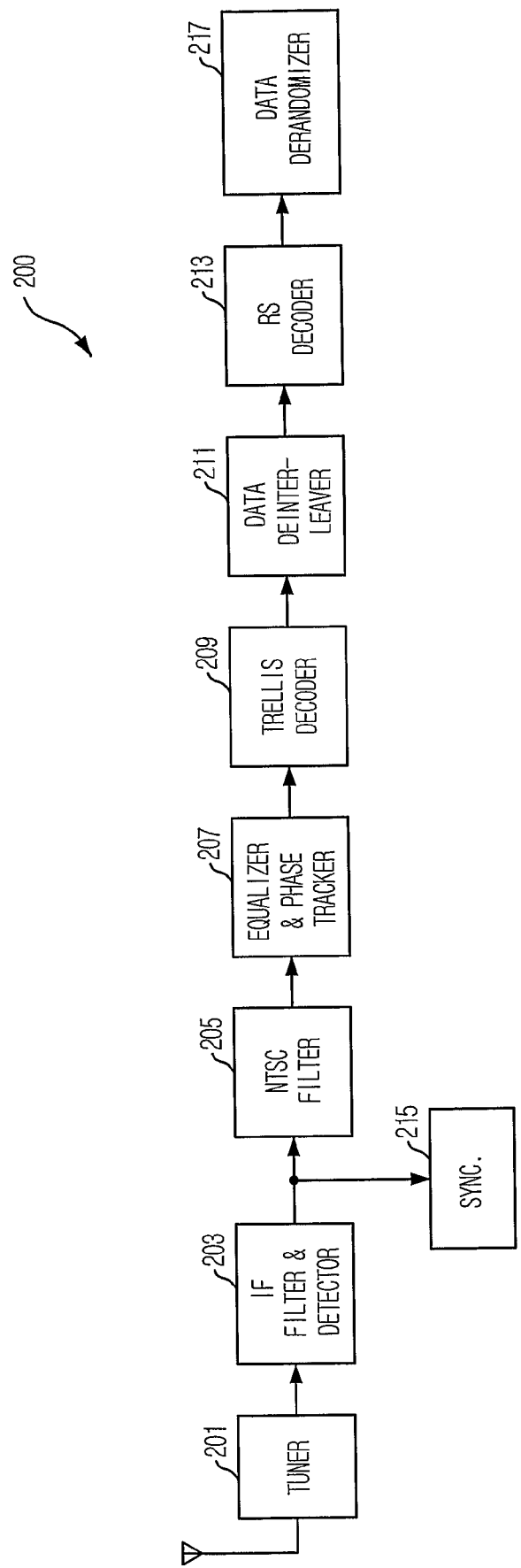
FIG. 2 is a block diagram illustrating a conventional DTV receiver.
Figure 3:
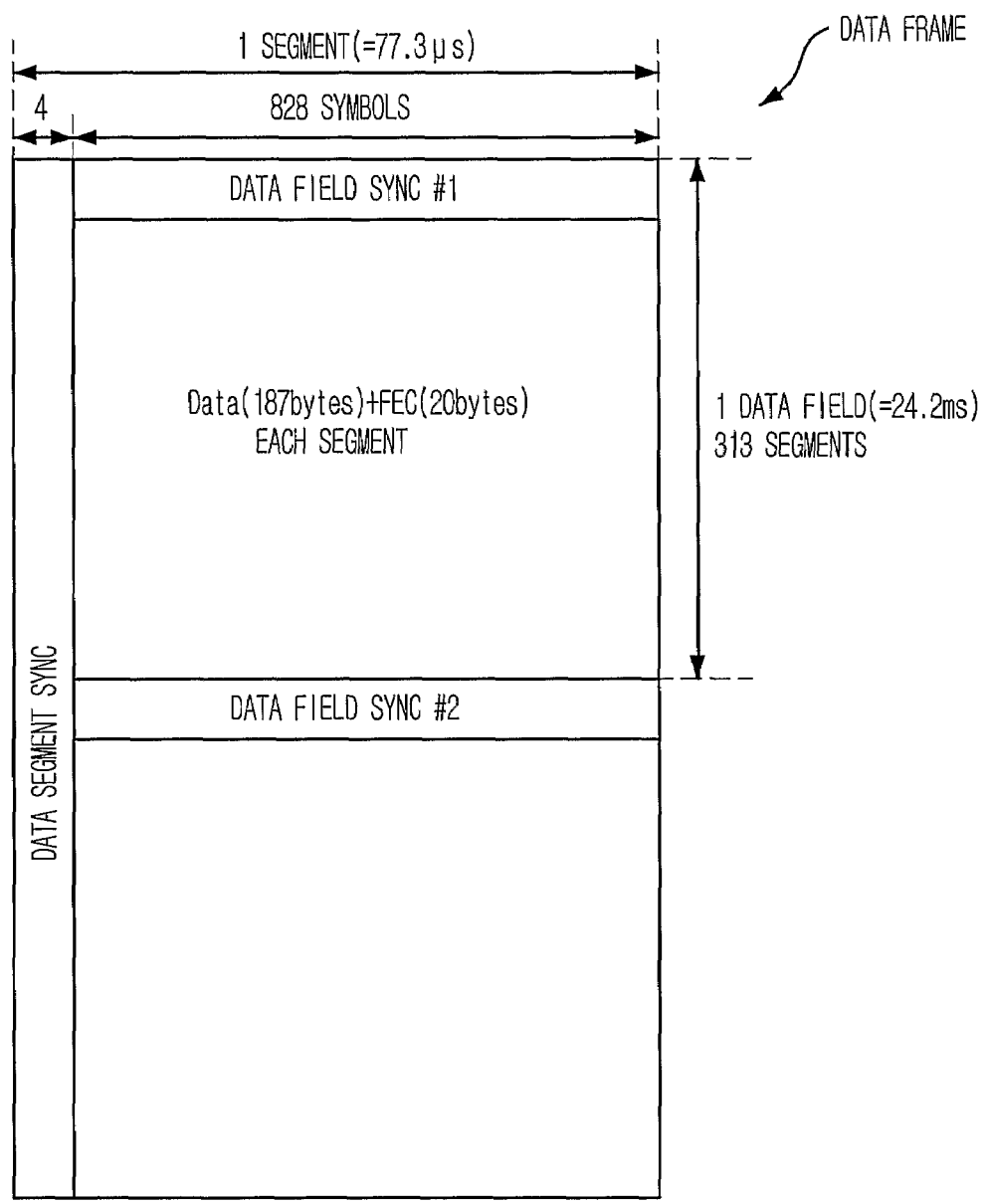
FIG. 3 is a diagram describing a transmission data frame exchanged between the transmitter of FIG. 1 and the receiver of FIG. 2.

The data randomizer 403, the RS encoder 405, the data interleaver 409, the trellis encoder 415, the second multiplexer 417, and a pilot adder/modulator/RF converter 419 are the same as the conventional data randomizer 101, the RS encoder 103, the data interleaver 105, the trellis encoder 107, the multiplexer 109, and a pilot adder 111, the Vestigial Side Band (VSB) modulator 113, and the RF converter 115, which were described with reference to FIG. 1.

The first multiplexer 401 multiplexes a normal data packet 421 and a robust data packet 423 under the control of a robust data flag signal 425.

A normal data packet 421 and a robust data packet 423 are serial data streams formed of 188-byte Moving Picture Experts Group (MPEG) compatible data packets and they have the same attributes, but the robust data packet includes an information packet and a null packet. A null packet includes arbitrary data, for example, "0," having a null packet header.

The robust data flag signal 425 is generated in an external device (not shown) based on the ratio of robust data to normal data in a field, i.e., the Number of Robust Data Packets (NRP), and the coding rate of the robust data. The other compositional elements of the transmitter 400 including the first multiplexer 401 can check out whether data processed currently by using the robust data flag signal 425 are robust data.

The first multiplexer 401 multiplexes the normal data packet 421, the robust data packet 423, and the robust data flag signal 425 based on the number of robust data packets for each field. In accordance with an embodiment, the position of a robust data packet can be defined as an equation 1 according to the number of the robust data packets.

$0 \leq NRP/2 \leq 39$:

$\{s|s=4i, i=0, 1, \ldots, NRP-1\}, (0 \leq s \leq 156)$ $40 \leq NRP/2 \leq 78$:

$\{s|s=4i, i=0, 1, \ldots, 77\} U \{s|s=4i+2, i=0, 1, \ldots, NRP-79\}$ $79 \leq NRP/2 \leq 117$:

$\{s|s=4i, i=0, 1, \ldots, 77\} U \{s|s=4i+2, i=0, 1, \ldots, 77\} U \{s|s=4i+1, i=0, 1, \ldots, NRP-157\}$ $118 \leq NRP/2 \leq 156$:

$\{s|s=4i, i=0, 1, \ldots, 77\} U \{s|s=4i+2, i=0, 1, \ldots, 77\} U \{s|s=4i+1, i=0, 1, \ldots, 77\} U \{s|s=4i, i=0, 1, \ldots, NRP-235\}$  Eq. 1

In the equation 1, NRP denotes the number of robust segments occupied by robust data packets for each data field, that is, the Number of Robust data Packets in a frame. As described above, the NRP is a value including all the number of information packet and null packets and it has a range of 0 to 312. Also, U signifies a union of two sets, and s denotes a data segment number in a data field and s has a range of 0 to 311.

In accordance with another embodiment, the position of a robust data packet can be defined as an equation 2.

$RPI=312/NRP$ $RPP=\text{floor}(RPI \times r)$  Eq. 2

In the equation 2, RPI stands for Robust Data Packet Interval and RPP denotes Robust Data Packet Position. Floor(*) is a decimal cutting operation, which means an operation cutting out a decimal number, for converting an arbitrary number * into an integer value, and a value r has a range of 0 to NRP.

The normal data packet 421 and the robust data packet 423 multiplexed in the first multiplexer 401 are randomized in the data randomizer 403, and each packet is encoded to include a 20-byte parity information for Forward Error Correction (FEC) in the RS encoder 405. In the RS encoder 405, data having a total of 207 bytes, which are transmitted for each data segment, are generated by adding 20 RS parity bytes for FEC to the 187-byte data. A robust data flag does not go through the randomization and RS encoding. If a robust data packet is RS encoded and 20 RS parity bytes are added, a robust data flag is marked for the added RS parity bytes.

Subsequently, the normal and robust data packets which are included in consecutive segments of each data field and RS-coded are inputted to the robust interleaver/packet formatter 407 and only robust data including information packet are interleaved based on a robust data flag. The interleaved robust data are reconstructed into a 207-byte packet according to the robust data coding rate, and the reconstructed robust data packet is multiplexed with the normal data packet. The normal data packet has a predetermined delay to be multiplexed with the robust data packet.

Figure 5:
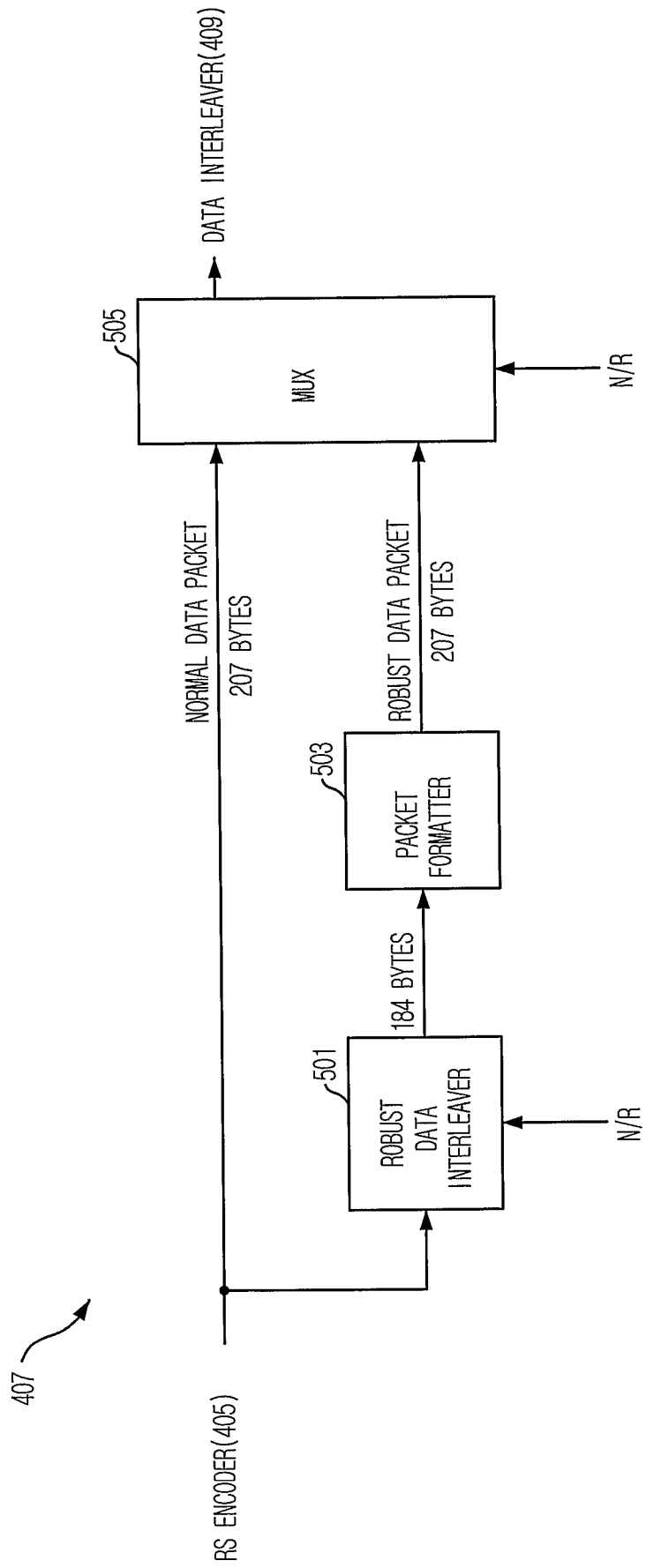
FIG. 5 is a block diagram depicting a robust interleaver and a packet formatter of FIG. 4.

FIG. 5 is a block diagram depicting a robust interleaver and a packet formatter of FIG. 4. As illustrated, the robust interleaver/packet formatter 407 includes a robust data interleaver 501, a packet formatter 503, and a third multiplexer 505.

Figure 6:
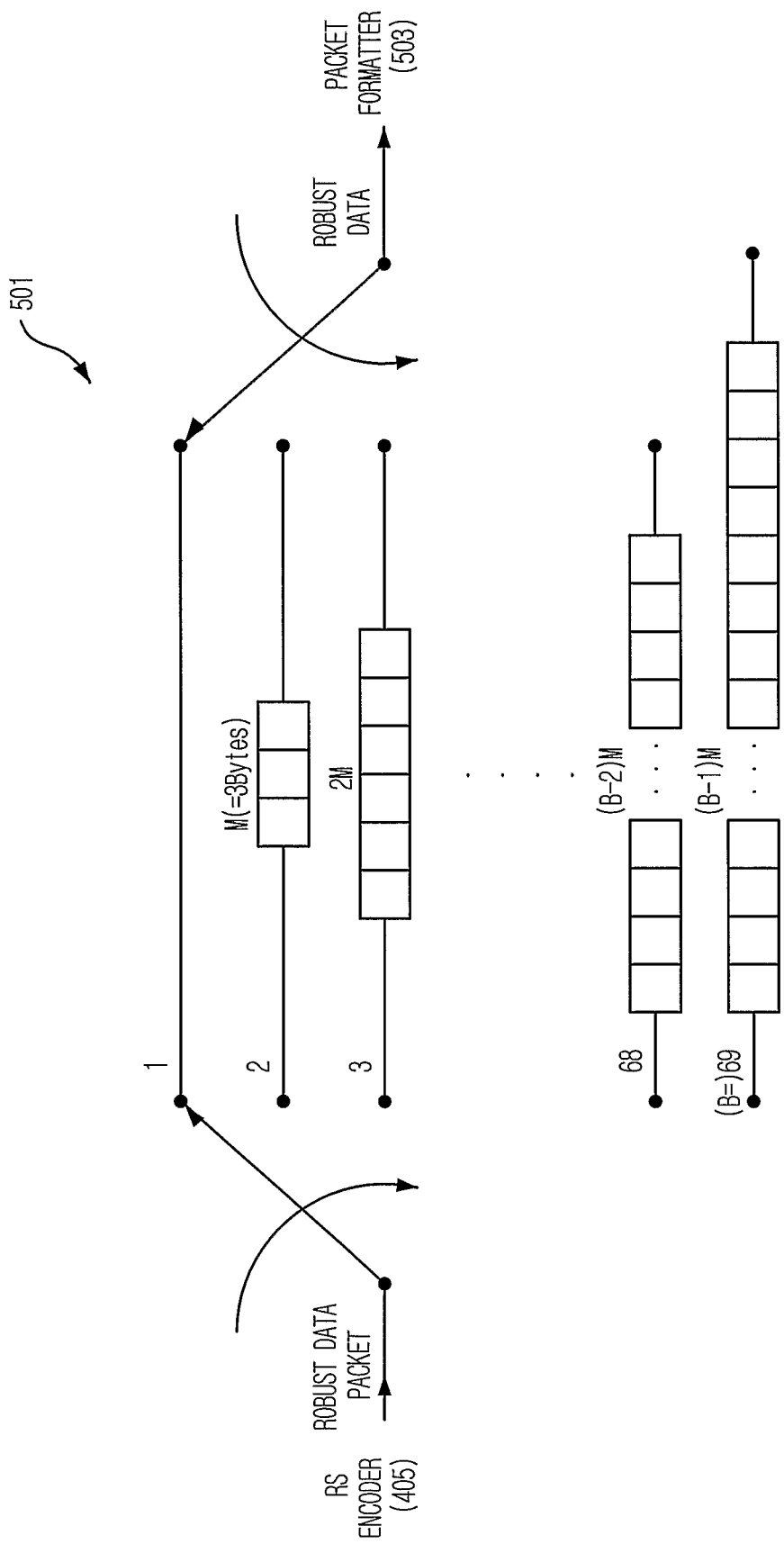
FIG. 6 is a diagram describing a robust data interleaver of FIG. 5.

The robust data interleaver 501 interleaves only a robust data packet based on a robust data flag signal. FIG. 6 is a diagram describing a robust data interleaver of FIG. 5. As shown, the robust data interleaver 501 receives signals on a byte basis with respect to a robust data packet only among data packets inputted from the RS encoder 405, performs interleaving to transmit the robust data to the packet formatter 503. Also, the robust data interleaver 501 has parameters M=3, B=69 and N=207, and forms the interleaved packet out of data from 69 different packets at maximum. Among the robust data packets, a null packet is abandoned and the interleaving is performed only on the information packets.

The packet formatter 503 shown in FIG. 5 processes the robust data interleaved in the robust data interleaver 501. The packet formatter 503 receives 184 bytes from the robust data interleaver 501 and generates four 207-byte data blocks with respect to the 184-byte robust data. Herein, four bits of each byte of the generated 207-byte data block, for example, LSB (6,4,2,0), corresponds to the inputted robust data. The other four bits, for example, MSB (7,5,3,1), are set up with arbitrary values. Meanwhile, in each of the generated 207-byte data blocks, the byte positions that do not correspond to the 184-byte robust data are filled with header-byte data or arbitrary information data to be used for RS parity bytes, which will be described later on.

Subsequently, the packet formatter 503 adds a header corresponding to a null packet to the first three bytes of each 207-byte data block. Then, the packet formatter 503 generates a 207-byte packet by adding 20 bytes, each of which is formed of arbitrary information, for example, "0," to each data block. The 20-byte arbitrary information is replaced with RS parity information in the robust data processor 413, which will be described later.

All the other vacant byte positions can be filled with bytes of the 184-byte robust data sequentially. The packet formatter 503 checks out whether a position corresponds to a parity byte position, before it adds robust data bytes to each newly generated 207-byte data block. If the position does not correspond to a parity byte, a robust data byte is placed in the position. If the position corresponds to a parity byte, the byte position is skipped and the next byte position is checked. The process is repeated until all the robust data bytes are placed in the newly generated 207-byte data block.

Therefore, if robust-interleaved two robust data packets (2×207 bytes) are inputted into the packet formatter 503, the packet formatter 503 outputs 9 packets (9×207 bytes), each of which is formed of robust data bytes, header bytes, and arbitrary information bytes for RS parity bytes. The outputted 9 packets include 46-bytes of the robust data inputted to the packet formatter 503, individually.

Meanwhile, the positions of arbitrary data bytes for RS parity bytes with respect to each packet are determined based on an equation 3.

$m=(52 \times n+(s \bmod 52)) \bmod 207$  Eq. 3

Herein, m denotes an output byte number, i.e., a parity byte position of a packet extended into 207 bytes; n denotes an input byte, i.e., a byte number in each packet, and it ranges from 0 to 206; s denotes a segment corresponding to robust data in a data field, i.e., a packet number, and it ranges from 0 to 311. The parity byte positions, i.e., the value m, can be calculated in the range of 187 to 206 only with respect to the value n so that the positions of 20 parity packets for each packet should correspond to the last 20 bytes of the packet. In short, the value n corresponds to the last 20 bytes of a packet.

A third multiplexer 505 of FIG. 5 multiplexes a robust data packet and a normal data packet, which are outputted from the packet formatter 503, based on a robust data flag. The operation of the third multiplexer 505 is the same as that of the first multiplexer 401.

Referring to FIG. 4 again, the data interleaver 409 interleaves data packets within consecutive segments of each data field on a byte basis to scramble the sequential order of a robust data flag and normal/robust data stream based on the ATSC A/53 standards and outputs scrambled data. The data interleaver 409 has a similar structure to the robust data interleaver 501 (see FIG. 6, M=4, B=52 and N=208).

Figure 7:
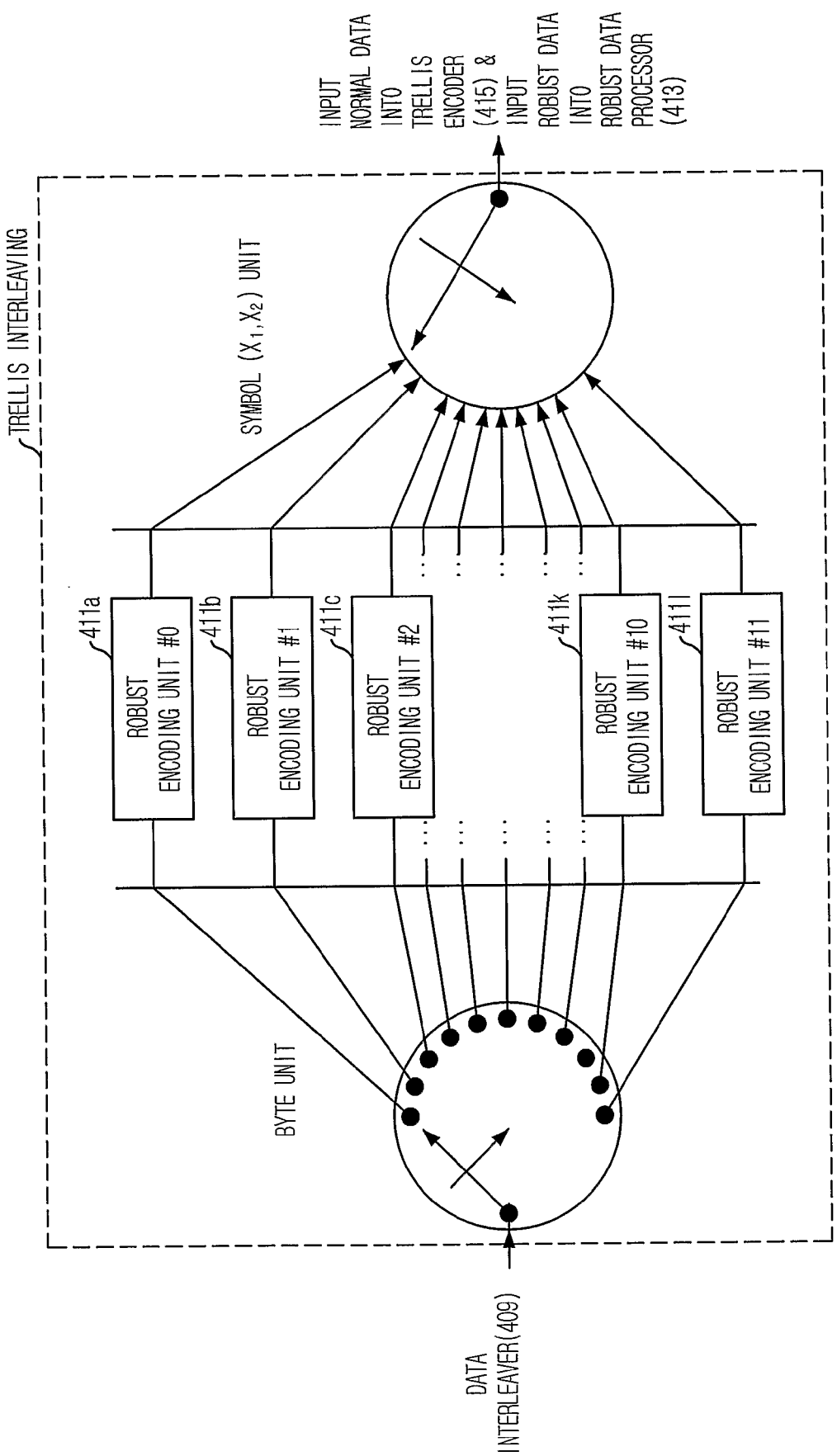
FIG. 7 is a diagram illustrating a robust encoder of FIG. 4.

FIG. 7 is a diagram illustrating a robust encoder of FIG. 4 in detail. As shown, the robust encoder 411 specifically includes a plurality of identical robust encoding units 411a to 411l in parallel. The robust encoder 411 performs trellis interleaving on the interleaved normal/robust data and the interleaved robust data flag and performs coding on the trellis-interleaved normal/robust data based on the trellis-interleaved robust data flag. The normal/robust data outputted from the data interleaver 409 are inputted into the 12 robust encoding units 411a to 411l sequentially on a byte basis, and two-bit normal/robust data expressed as $X_1'$ and $X_2'$ are coded into two-bit normal/robust data symbols expressed as $X_1$ and $X_2$. For example, an input bit $X_2'$ is a code word of MSB(7, 5,3,1) and an input bit $X_1'$ is a code word of LSB(6,4,2,0). As described above, although the MSB(7,5,3,1) and the LSB(6, 4,2,0) of normal data all include information data, the LSB (6,4,2,0) of robust data includes information data and the MSB(7,5,3,1) of robust data includes arbitrary values.

The normal data symbols among data symbols coded in the robust encoding unit 411 is inputted to the trellis encoder 415 by bypassing the robust data processor 413, and robust data symbols are inputted to the trellis encoder 415 through the robust data processor 413. In this process, the data symbols coded in the 12 robust encoding units 411a to 411l are inputted into the trellis encoder 415 or the robust data processor 413 sequentially to thereby performing the trellis interleaving entirely.

Referring to FIG. 4, the trellis encoder 415 is the same as the trellis encoder defined in the current ATSC A/53 Standards. Although not illustrated in the drawing, the trellis encoder 415, too, is formed of a plurality of identical trellis encoding units, for example, 12 identical trellis encoding units connected in parallel, just as the robust encoder 411. The normal data symbols X1 and X2 inputted into the trellis encoder 415 after bypassing the robust data processor 413 or the robust data symbols X1 and X2 inputted into the trellis encoder 415 through the robust data processor 413 are inputted into the 12 trellis encoding units, and the trellis encoder 415 performs trellis encoding on the inputted symbols X1 and X2 into 8-level symbols. The 8-level symbols obtained by being encoded in the 12 trellis encoding units are inputted into the second multiplexer 417 sequentially. This way, the trellis encoding is carried out entirely.

Figure 8:
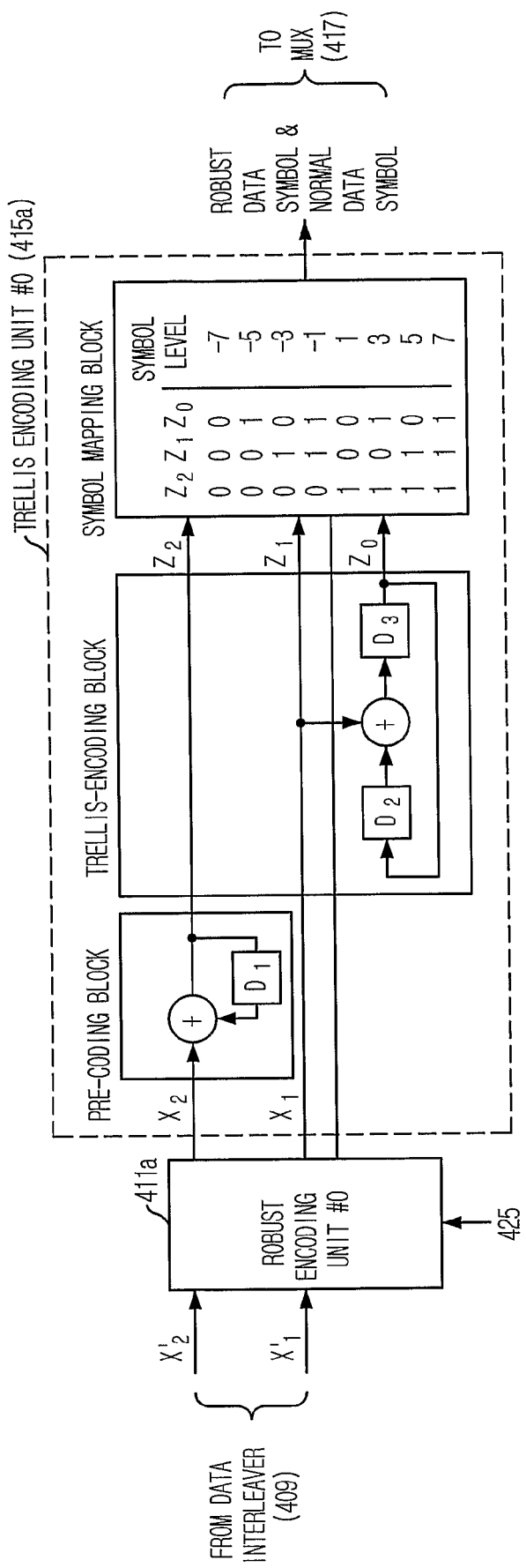
FIG. 8 is a diagram describing a robust encoder and a trellis encoder of FIG. 4.

FIG. 8 is a diagram describing a robust encoder and a trellis encoder of FIG. 4. Since the robust data processor 413 to be described later processes only robust data, FIG. 8 exemplifies conceptual connection between a robust encoding unit #0 411a and a trellis encoding unit #0 415a.

As defined in the current ATSC A/53 Standards, the trellis encoder 415 includes a pre-coding block, a trellis encoding block, and a symbol mapping block. The pre-coding block and the trellis encoding block include one and two registers (D) for storing symbol delay values, for example, 12 symbol delay values, respectively.

The robust encoding unit #0 411a codes two-bit normal/robust data $X_1'$ and $X_2'$ inputted from the data interleaver 409 into two-bit normal/robust data symbols $X_1$ and $X_2$, and the trellis encoding unit #0 415a outputs 8-level signals to the second multiplexer 417 based on symbols $Z_0$, $Z_1$ and $Z_2$ obtained by performing trellis encoding on the two-bit normal/robust data symbols $X_1$ and $X_2$.

A method for coding robust data by using the robust encoder 411 and the trellis encoder 415 is already suggested by the Phillips Company and the Electronics and Telecommunications Research Institute (ETRI).

Figure 9:
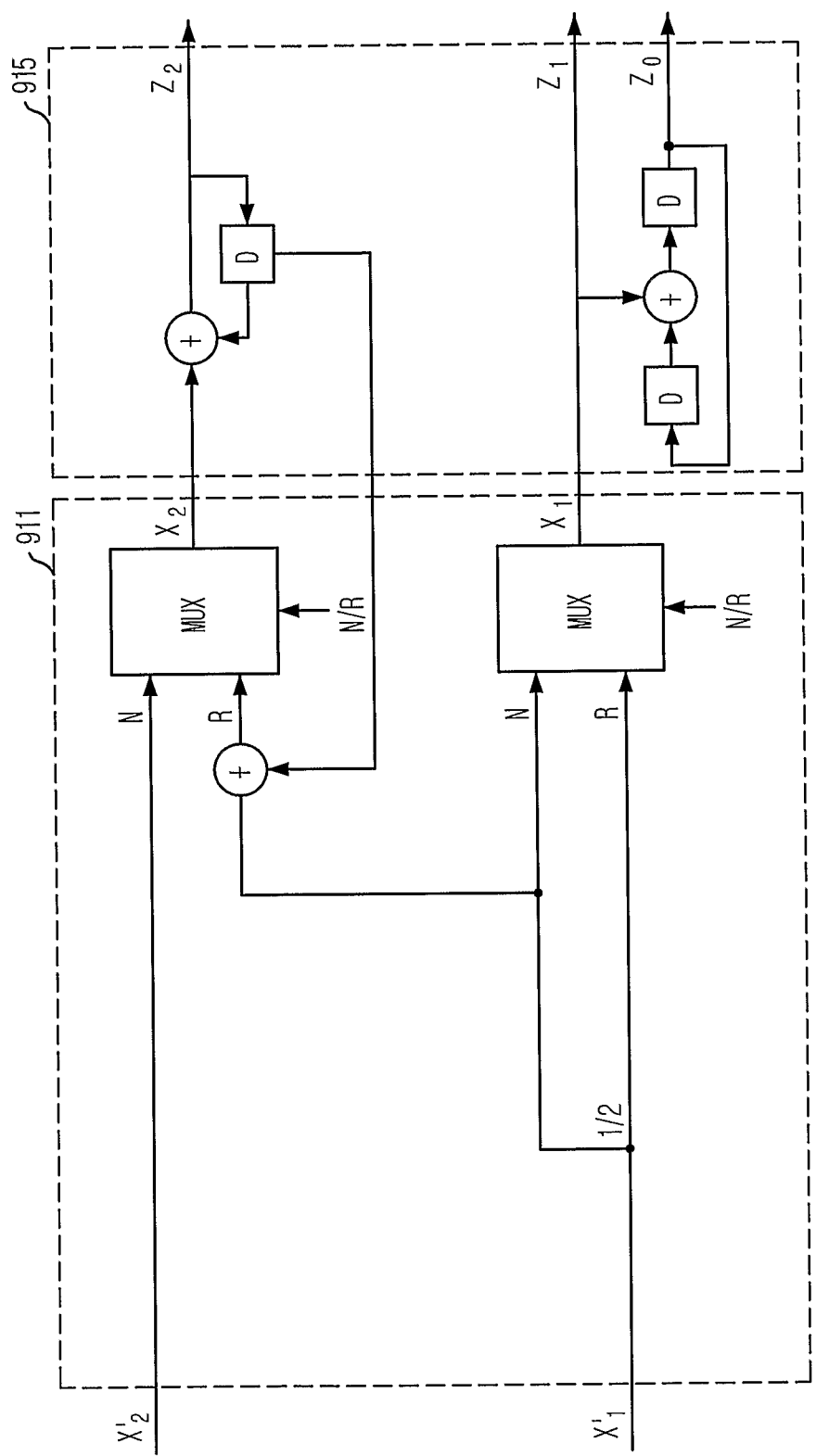
FIG. 9 is a block diagram describing robust data trellis coding in a P-2VSB method which is suggested by a Philips Company.

FIG. 9 is a block diagram describing P-2VSB coding of robust data which is suggested by the Philips Company.

As described above, a robust encoder 911 outputs the trellis-encoded symbols $Z_0$, $Z_1$ and $Z_2$ in four levels of $\{-7,-5, 5,7\}$ by equalizing the coded values $Z_2$ and $Z_1$ of a trellis encoder 915 obtained through a precoder remover based on the value $X_1'$ between the inputted signals $X_1'$ and $X_2'$.

Figure 10:
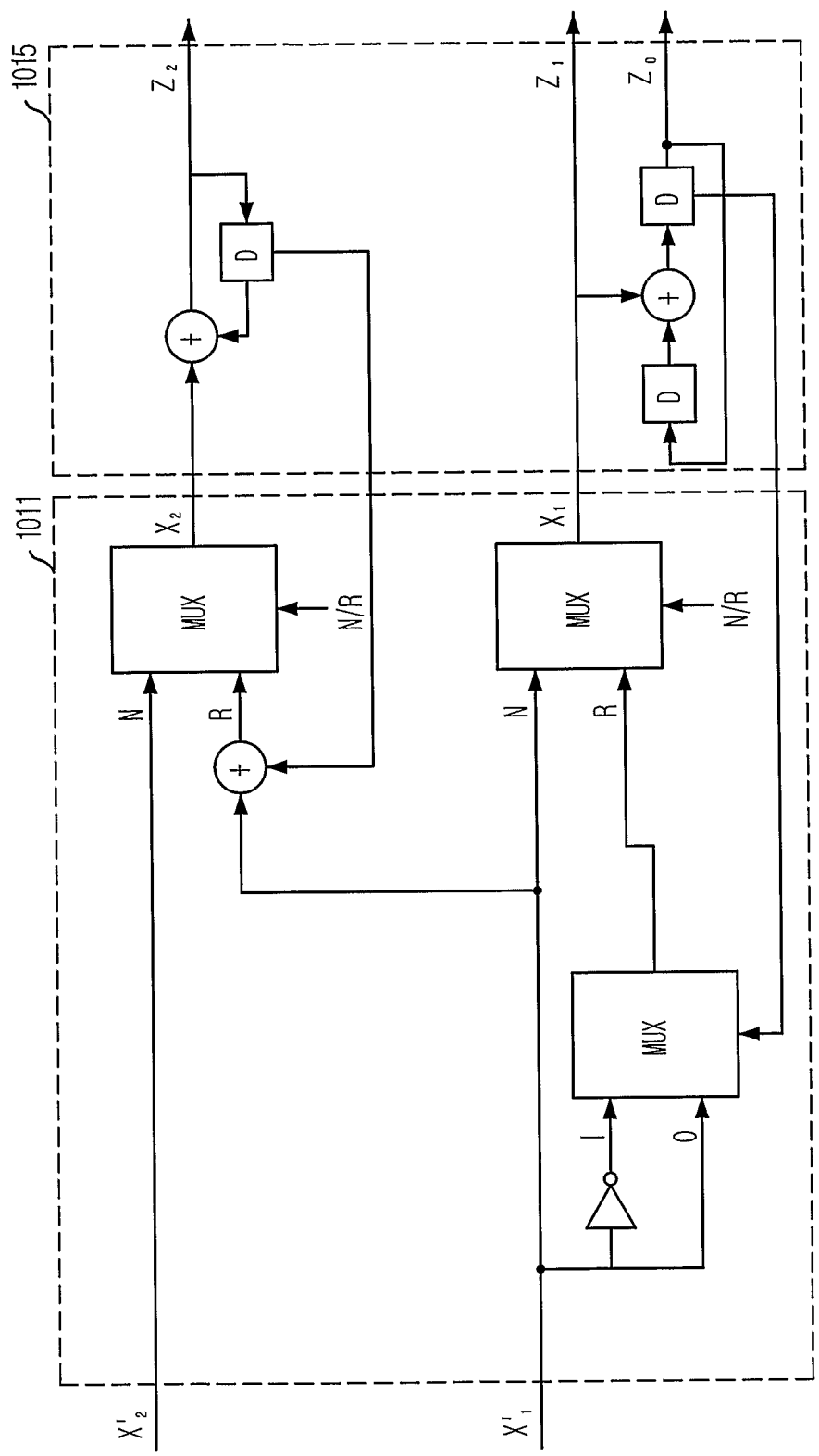
FIGS. 10 and 11 are block diagrams showing robust data trellis coding in an E-4VSB method which is suggested by the Electronics and Telecommunications Research Institute (ETRI)
Figure 11:
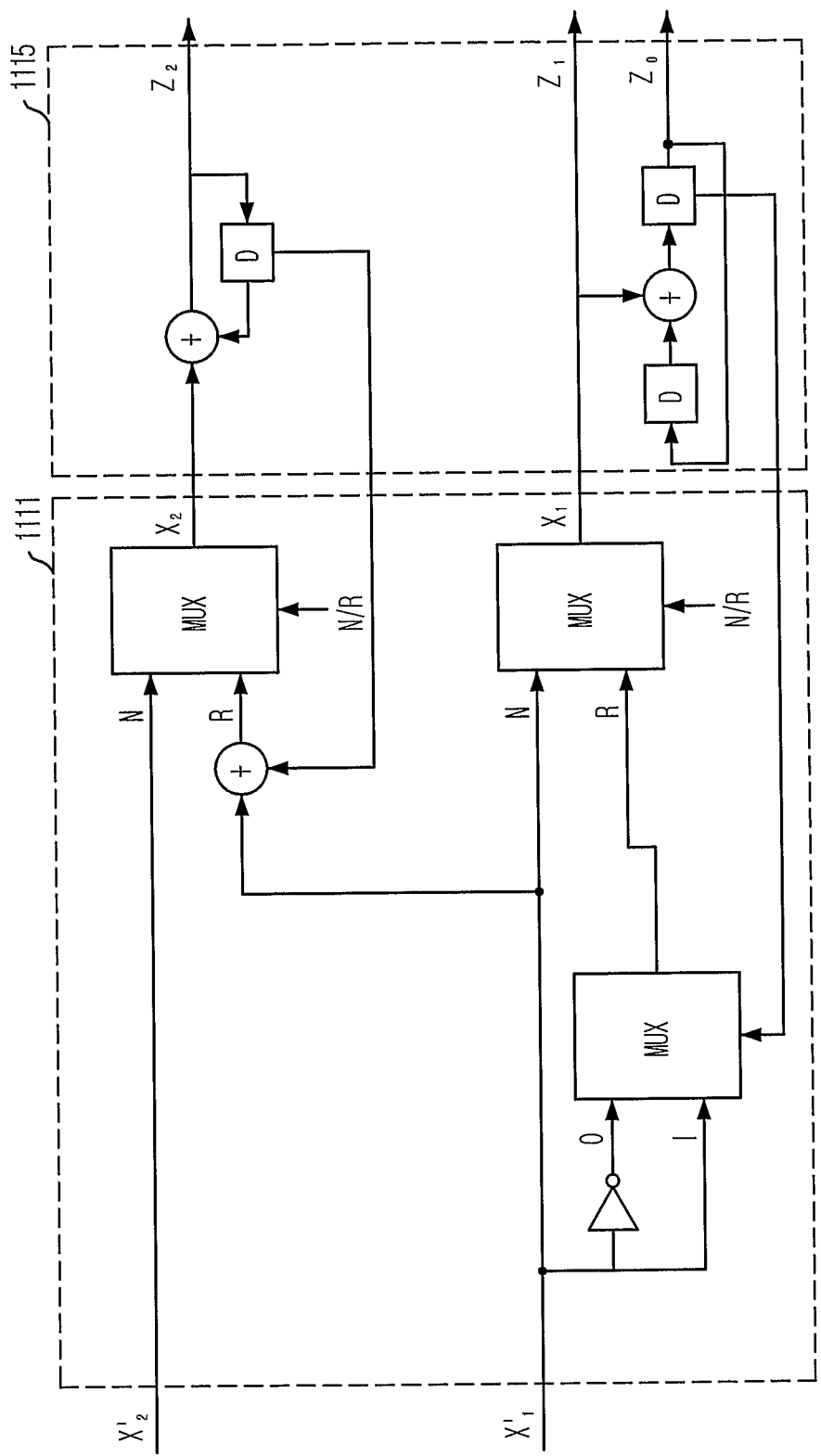

FIGS. 10 and 11 are block diagrams showing robust data trellis coding in E-4VSB method which is suggested by the ETRI. A robust encoder 1011 of FIG. 10 estimates a coded value $Z_0$ of a trellis encoder 1015 and makes the coded values $Z_2$ and $Z_1$ of the trellis encoder 1015 have the same value based on the value of an input signal $X_1'$, when the value $Z_0$ is 0.

Also, the robust encoder 1011 codes robust data in such a manner that the coded values Z2 and Z1 of the standard trellis encoder have values inverse to each other, when the coded value Z0 of the trellis encoder 1015 is 1 and, thus, the level of symbols outputted from the trellis encoder 1015 is $\{-7,-1,3, 5\}$.

A robust encoder 1111 of FIG. 11 estimates a coded value $Z_0$ of a trellis encoder 1115 and makes the coded values $Z_2$ and $Z_1$ of the trellis encoder 1115 have values inverse to each other based on the value of an input signal $X_1'$, when the value $Z_0$ is 0.

Also, the robust encoder 1111 codes robust data in such a manner that the coded values $Z_2$ and $Z_1$ of the standard trellis encoder have the same value, when the coded value $Z_0$ of the trellis encoder 1115 is 1 and, thus, the level of symbols outputted from the trellis encoder 1115 is $\{-5,-3,1,7\}$.

Figure 12:
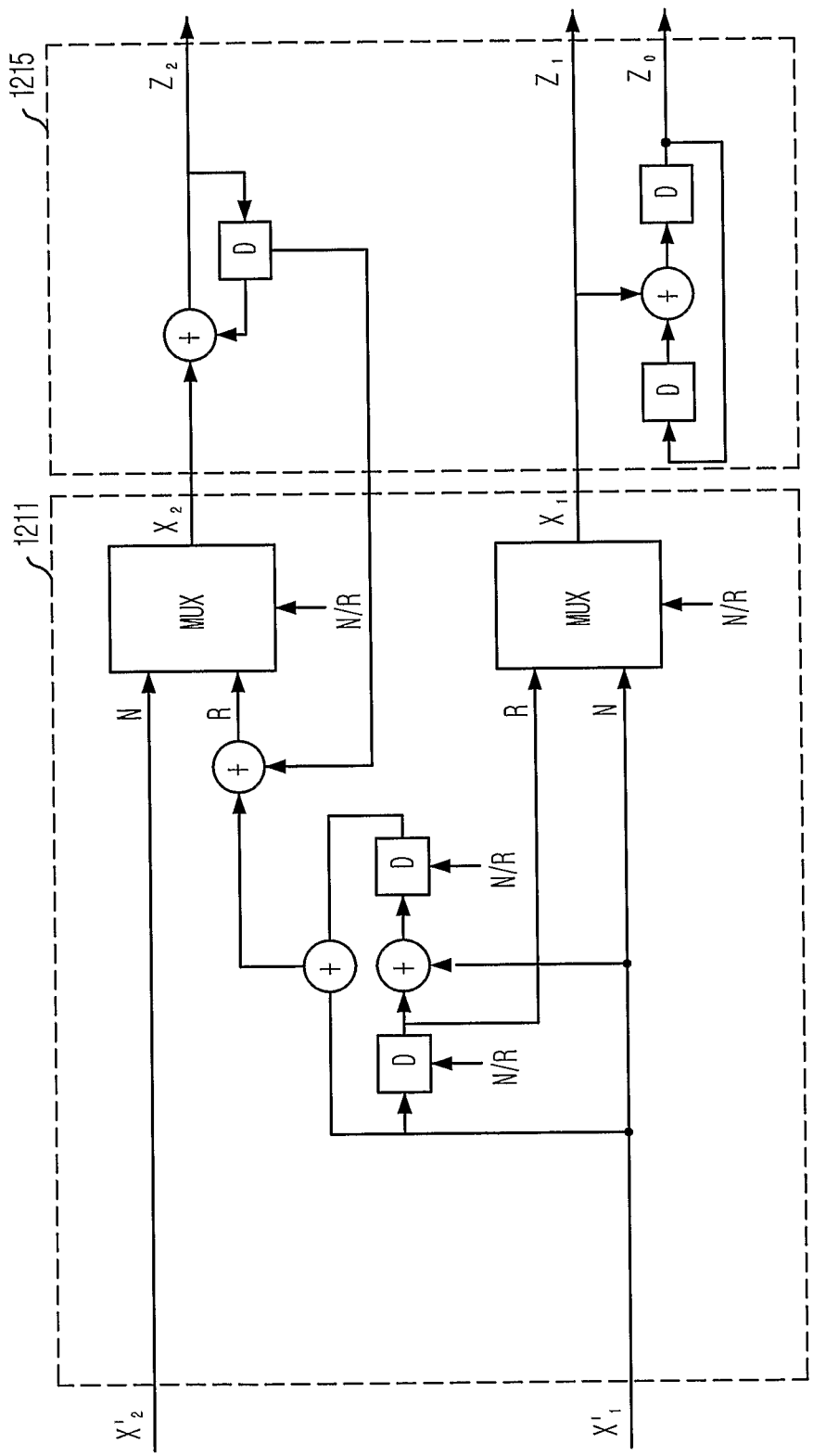
FIGS. 12 and 13 are block diagrams illustrating robust data trellis coding in an E-8VSB method which is suggested by the ETRI.
Figure 13:
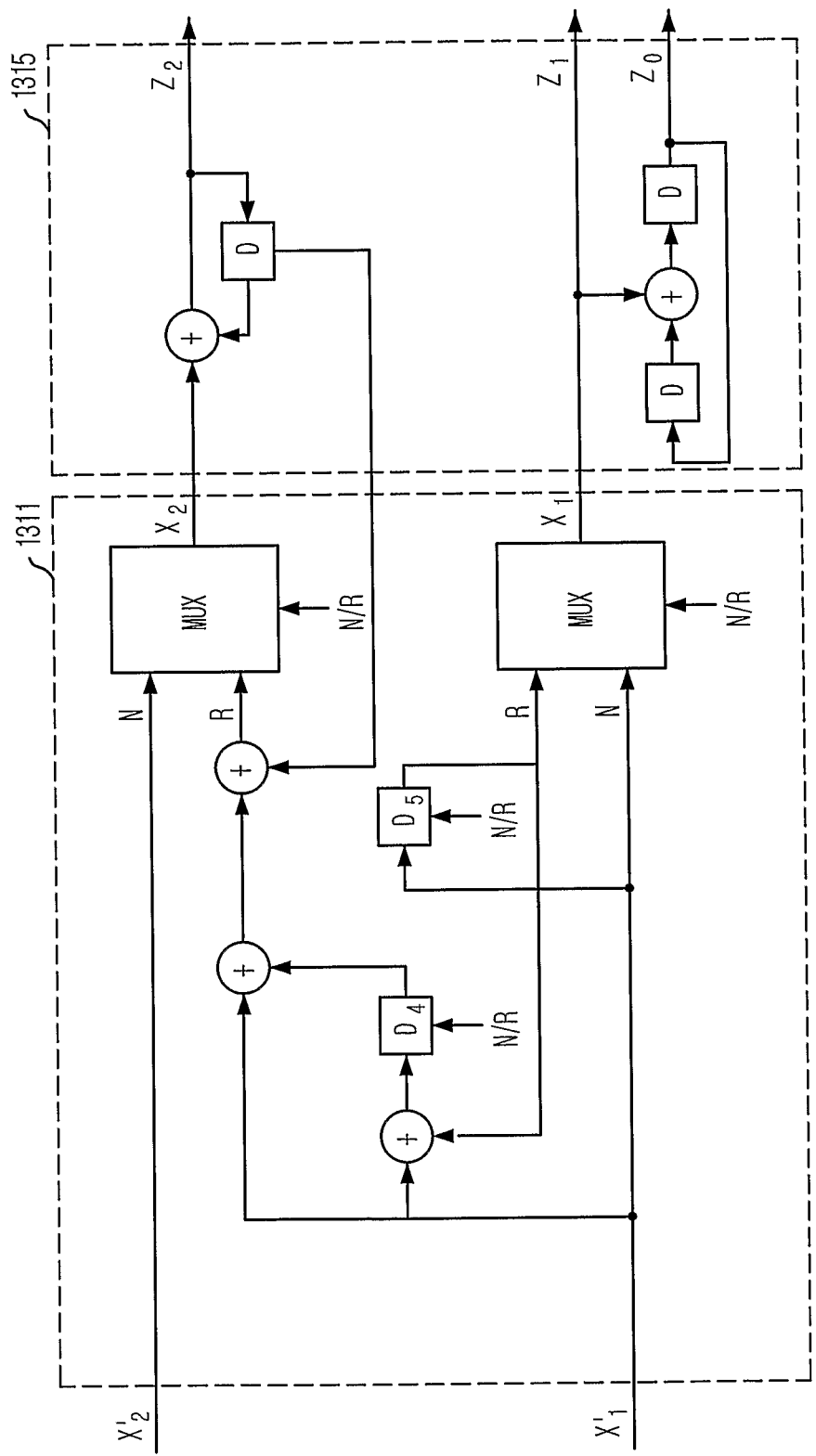

FIGS. 12 and 13 are block diagrams illustrating robust data E-8VSB coding which is suggested by the ETRI.

As shown in FIGS. 12 and 13, an input signal $X_1'$ is coded by adding registers for generating robust data to robust encoders 1211 and 1311.

The robust data are coded to have a total of 16 states including the robust encoders 1211 and 1311 and the trellis encoders 1215 and 1315 so that the level of output symbol value of the trellis encoder 1115 should become the same as the standard 8-VSB, i.e., $\{-7,-5,-3,-1,1,3,5,7\}$.

The aforementioned P-2VSB, E-4VSB and E-8VSB robust data generation methods transmit one-bit data through one symbol at a data transmission rate a half as fast as normal data. The present invention improves the performance of the receiver by performing additional Forward Error Correction (FEC) on the robust data and transmitting/receiving ¼-rate coded robust data so that one-bit data can be transmitted through two symbols.

Figure 14:
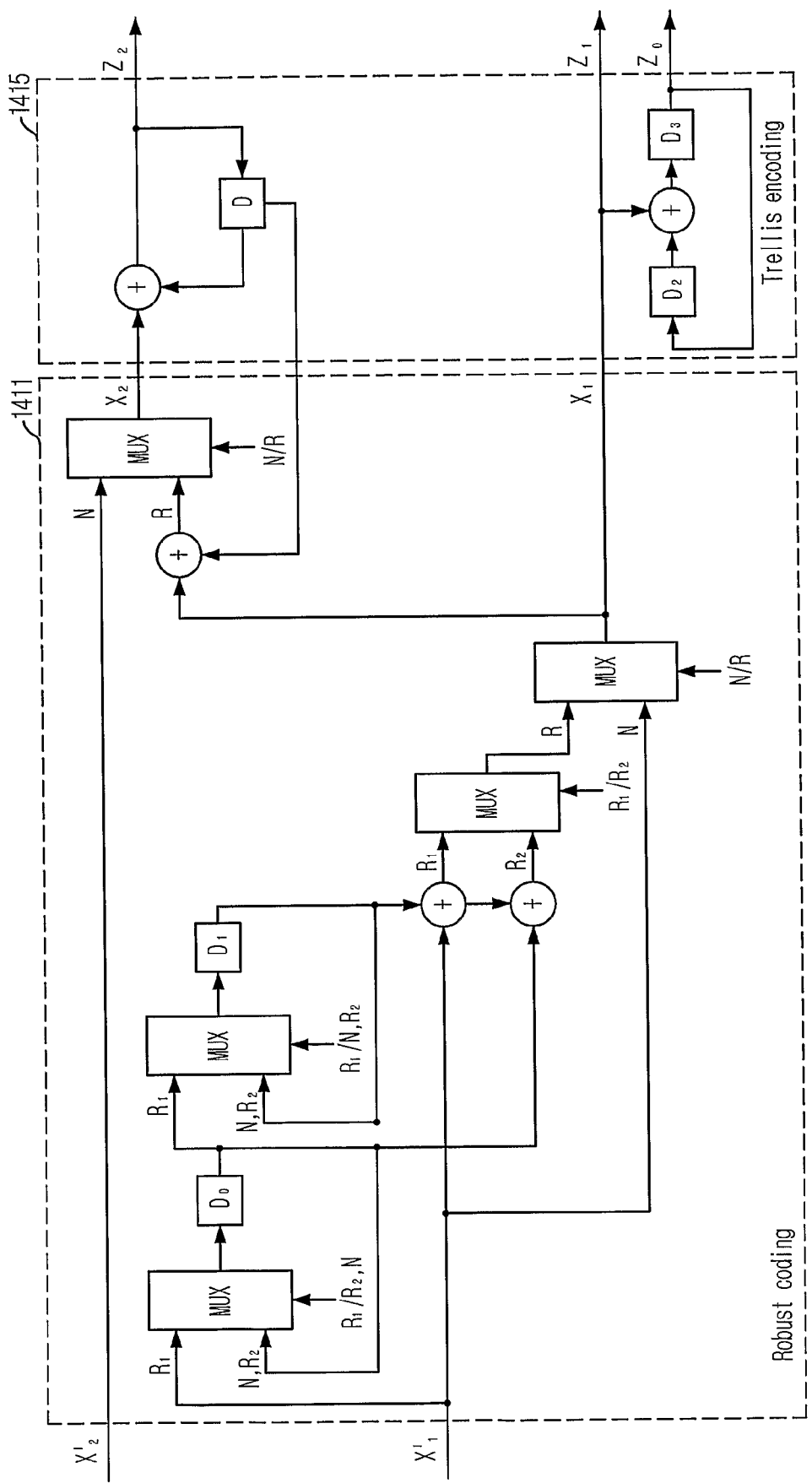
FIG. 14 is a block diagram describing ¼ rate coding applied to the P-2VSB of the Phillips Company in accordance with an embodiment of the present invention.

FIG. 14 is a block diagram describing ¼ rate coding applied to the P-2VSB of the Phillips Company in accordance with an embodiment of the present invention.

As illustrated in the drawing, registers D0 and D1 for generating robust data are added to a robust encoder 1411 and input data $X_1'$ are coded by using four registers D0, D1, D2 and D3. When the multiplexer selects an R1 input based on a control bit R1/R2 with respect to the one-bit input data $X_1'$, one symbol is outputted from a trellis encoder 1415. When the multiplexer selects an R2 input, another symbol is outputted from the trellis encoder 1415. When the first symbol R1 is generated, the values of the registers D0 and D1 can be changed. However, when the second symbol R2 is generated, the values are maintained. The output signal and subsequent state of the trellis encoder 1415 based on the input data $X_1'$ are as shown in Tables 1 and 2, respectively.

TABLE 1

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −5 | −7 | −5 | 5 | 7 | 5 | 7 | −7 | −5 | −7 | −5 | 5 | 7 | 5 | 7 |
|   | R2 | −7 | −7 | −5 | −5 | 7 | 7 | 5 | 5 | 5 | 5 | 7 | 7 | −5 | −5 | −7 | −7 |
| 1 | R1 | 5 | 7 | 5 | 7 | −7 | −5 | −7 | −5 | 5 | 7 | 5 | 7 | −7 | −5 | −7 | −5 |
|   | R2 | 7 | 7 | 5 | 5 | −7 | −7 | −5 | −5 | −5 | −5 | −7 | −7 | 5 | 5 | 7 | 7 |

TABLE 2

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 3 | 2 | 1 | 0 | 5 | 4 | 7 | 6 | 6 | 7 | 4 | 5 |
| 1 | 11 | 10 | 9 | 8 | 8 | 9 | 10 | 11 | 14 | 15 | 12 | 13 | 13 | 12 | 15 | 14 |

Table 1 shows two output symbols according to input of robust data. The R1 indicates the first symbol and the R2 indicates the second symbol. Table 2 shows the state after the generation of two symbols upon the input of robust data. The 16 states S of Table 1 and 2 including the current state and the subsequent state are calculated based on an equation 4. The definitions of R1 and R2 and subsequent state are the same in the other embodiments.

$$S = D0 \times 8 + D1 \times 4 + D2 \times 2 + D3 \qquad \text{Eq. 4}$$

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 1 and 2 to thereby improve the performance of the receiver.

Figure 15:
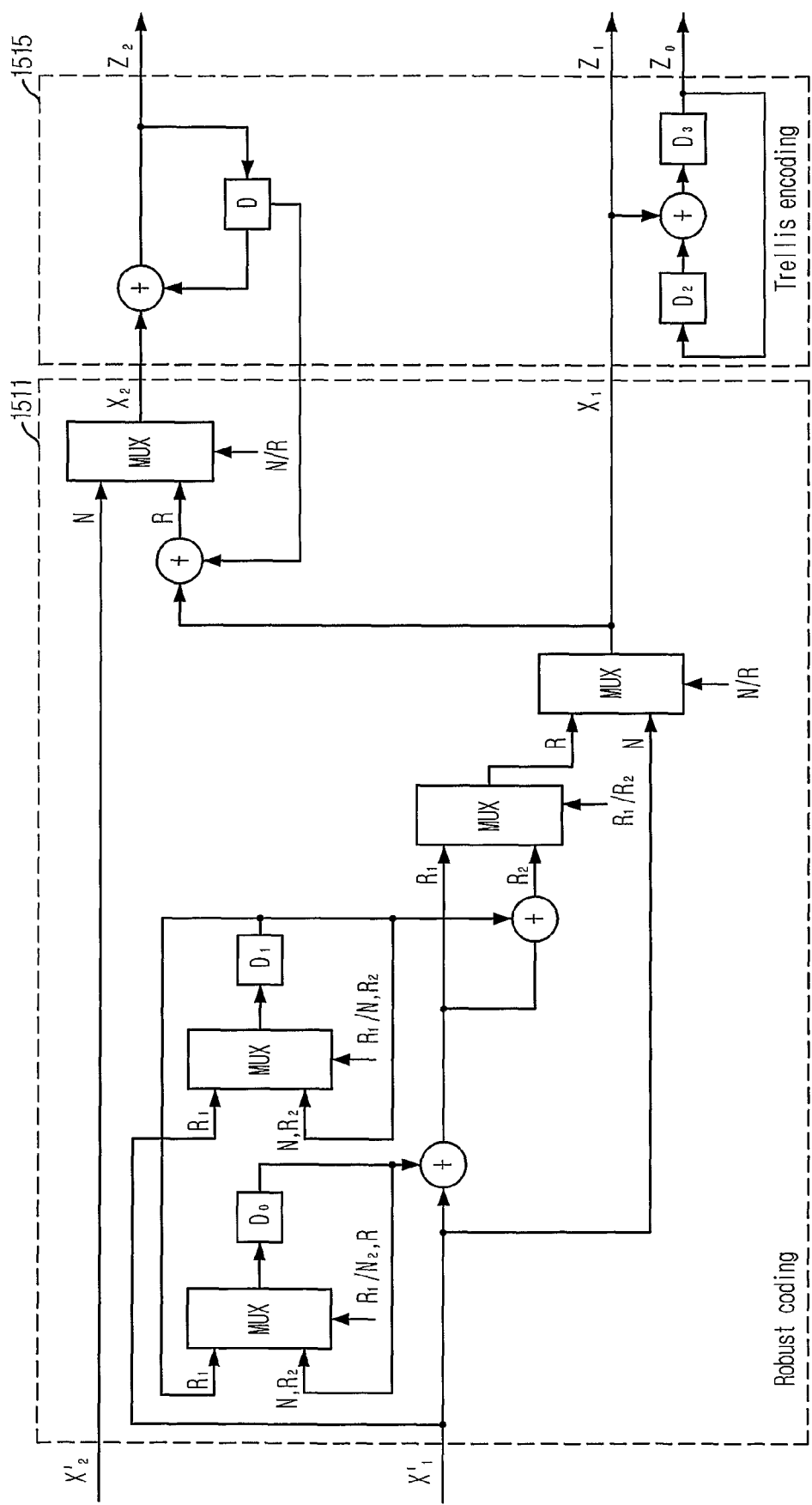
FIG. 15 is a block diagram describing ¼ rate coding applied to the P-2VSB of the Phillips Company in accordance with another embodiment of the present invention.

FIG. 15 is a block diagram describing ¼ rate coding applied to the P-2VSB of the Phillips Company in accordance with another embodiment of the present invention. It shows a structure of FIG. 14 with switched D0 and D1.

As illustrated in the drawing, registers D0 and D1 for generating robust data are added to a robust encoder 1511, and input data $X_1'$ are coded by using four registers D0, D1, D2 and D3. When the multiplexer selects an R1 input based on a control bit R1/R2 with respect to the one-bit input data $X_1'$ based on a control bit R1/R2, one symbol is outputted from a trellis encoder 1515 and, when the multiplexer selects an R2 input, another symbol is outputted from the trellis encoder 1515. When the first symbol R1 is generated, the values of the registers D0 and D1 can be changed. However, when the second symbol R2 is generated, the values are maintained. The output signals and subsequent state of the trellis encoder 1515 based on the input data $X_1'$ are as shown in Tables 5 and 6, respectively.

TABLE 3

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | −7, 1 | −5, 3 | −7, 1 | −5, 3 | −7, 1 | −5, 3 | −7, 1 | −5, 3 | −7, 1 | −5, 3 | −7, 1 | −5, 3 | −7, 1 | −5, 3 | −7, 1 | −5, 3 |
| 1 | −3, 5 | −1, 7 | −3, 5 | −1, 7 | −3, 5 | −1, 7 | −3, 5 | −1, 7 | −3, 5 | −1, 7 | −3, 5 | −1, 7 | −3, 5 | −1, 7 | −3, 5 | −1, 7 |

TABLE 4

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 2 | 1 | 3 | 4 | 6 | 5 | 7 | 8 | 10 | 9 | 11 | 12 | 14 | 13 | 15 |
| 1 | 1 | 3 | 0 | 2 | 5 | 7 | 4 | 6 | 9 | 11 | 8 | 10 | 13 | 15 | 12 | 14 |

TABLE 5

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −5 | −7 | −5 | −7 | −5 | −7 | −5 | 5 | 7 | 5 | 7 | 5 | 7 | 5 | 7 |
| | R2 | −7 | −7 | −5 | −5 | 5 | 5 | 7 | 7 | 7 | 7 | 5 | 5 | −5 | −5 | −7 | −7 |
| 1 | R1 | 5 | 7 | 5 | 7 | 5 | 7 | 5 | 7 | −7 | −5 | −7 | −5 | −7 | −5 | −7 | −5 |
| | R2 | 7 | 7 | 5 | 5 | −5 | −5 | −7 | −7 | −7 | −7 | −5 | −5 | 5 | 5 | 7 | 7 |

TABLE 6

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 9 | 8 | 11 | 10 | 3 | 2 | 1 | 0 | 10 | 11 | 8 | 9 |
| 1 | 7 | 6 | 5 | 4 | 14 | 15 | 12 | 13 | 4 | 5 | 6 | 7 | 13 | 12 | 15 | 14 |

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 5 and 6 to thereby improve the performance of the receiver.

Figure 16:
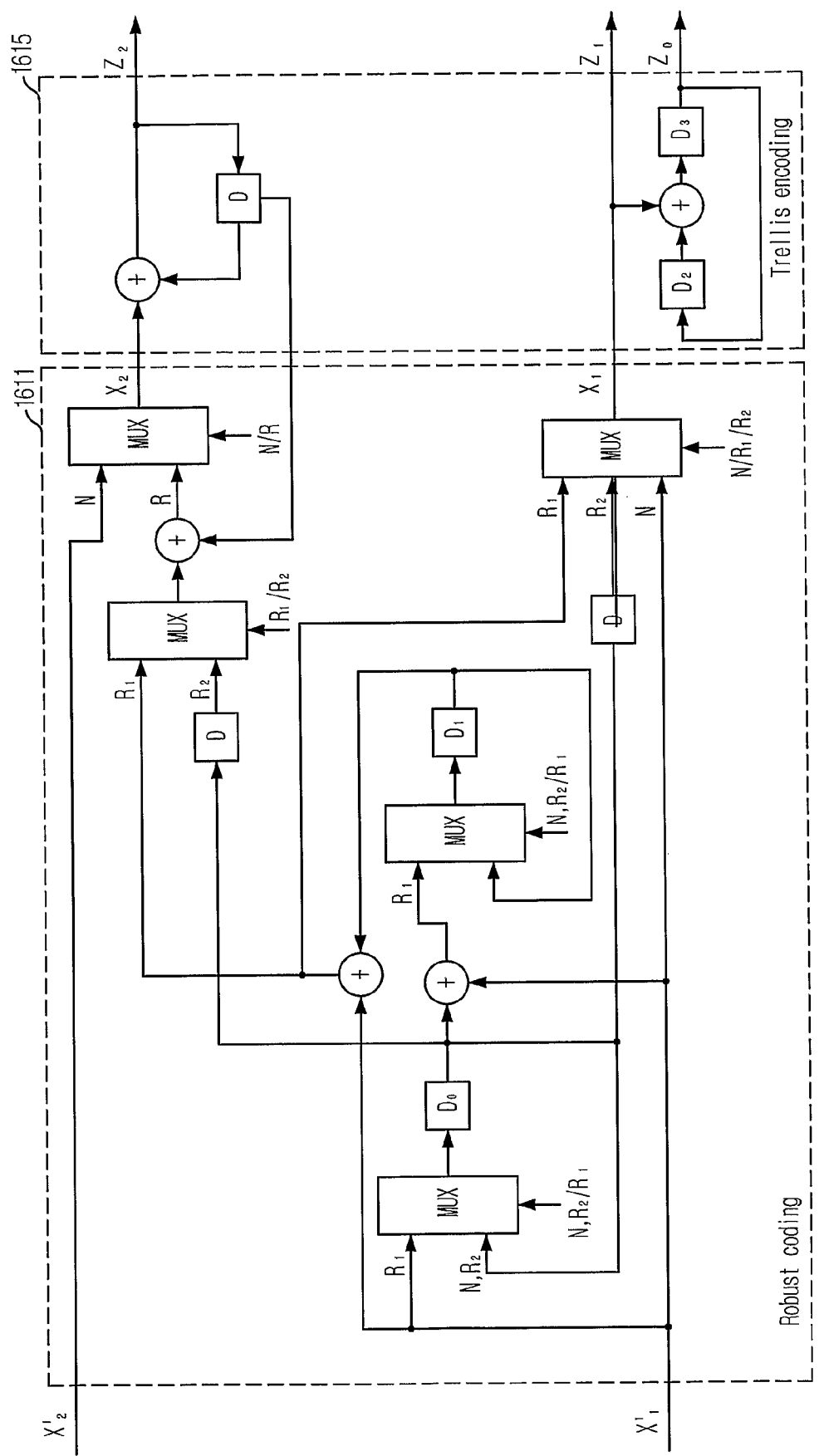
FIG. 16 is a block diagram describing ¼ rate coding applied to the P-2VSB of the Phillips Company in accordance with yet another embodiment of the present invention.

FIG. 16 is a block diagram describing ¼ rate coding applied to the P-2VSB of the Phillips Company in accordance with yet another embodiment of the present invention.

As illustrated in the drawing, registers D0 and D1 for generating robust data are added to a robust encoder 1611, and input data $X_1'$ are coded by using four registers D0, D1, D2 and D3. When the multiplexer selects an R1 input with respect to one-bit input data $X_1'$ based on a control bit R1/R2, one symbol is outputted from a trellis encoder 1615 and, when the multiplexer selects an R2 input, another symbol is outputted from the trellis encoder 1615. When the first symbol R1 is generated, the values of the registers D0 and D1 can be changed. However, when the second symbol R2 is generated, the values are maintained. The output signals and subsequent state of the trellis encoder 1615 based on the input data $X_1'$ are as shown in Tables 7 and 8, respectively.

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 7 and 8 to thereby improve the performance of the receiver.

FIG. 16 also has a case where the positions of the registers D0 and D1 switched with each other, just as the cases of FIGS. 14 and 15. When the positions of the registers D0 and D1 are switched in FIG. 16, the characteristics can be described based on the following Tables 9 and 10, respectively.

TABLE 7

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | 7 | −5 | −7 | −5 | 5 | 7 | 5 | 7 | −7 | −5 | −7 | −5 | 5 | 7 | 5 | 7 |
| | R2 | −7 | −7 | −5 | −5 | −5 | −5 | −7 | −7 | 5 | 5 | 7 | 7 | 7 | 7 | 5 | 5 |
| 1 | R1 | 5 | 7 | 5 | 7 | −7 | −5 | −7 | −5 | 5 | 7 | 5 | 7 | −7 | −5 | −7 | −5 |
| | R2 | −5 | −5 | −7 | −7 | −7 | −7 | −5 | −5 | 7 | 7 | 5 | 5 | 5 | 5 | 7 | 7 |

TABLE 8

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 2 | 3 | 0 | 1 | 5 | 4 | 7 | 6 | 7 | 6 | 5 | 4 |
| 1 | 14 | 15 | 12 | 13 | 12 | 13 | 14 | 15 | 11 | 10 | 9 | 8 | 9 | 8 | 11 | 10 |

TABLE 9

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | 7 | −5 | −7 | −5 | −7 | −5 | −7 | −5 | 5 | 7 | 5 | 7 | 5 | 7 | 5 | 7 |
| | R2 | −7 | −7 | −5 | −5 | 5 | 5 | 7 | 7 | −5 | −5 | −7 | −7 | 7 | 7 | 5 | 5 |
| 1 | R1 | 5 | 7 | 5 | 7 | 5 | 7 | 5 | 7 | −7 | −5 | −7 | −5 | −7 | −5 | −7 | −5 |
| | R2 | −5 | −5 | −7 | −7 | 7 | 7 | 5 | 5 | −7 | −7 | −5 | −5 | 5 | 5 | 7 | 7 |

TABLE 10

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 9 | 8 | 11 | 10 | 2 | 3 | 0 | 1 | 11 | 10 | 9 | 8 |
| 1 | 14 | 15 | 12 | 13 | 7 | 6 | 5 | 4 | 12 | 13 | 14 | 15 | 5 | 4 | 7 | 6 |

Figure 17:
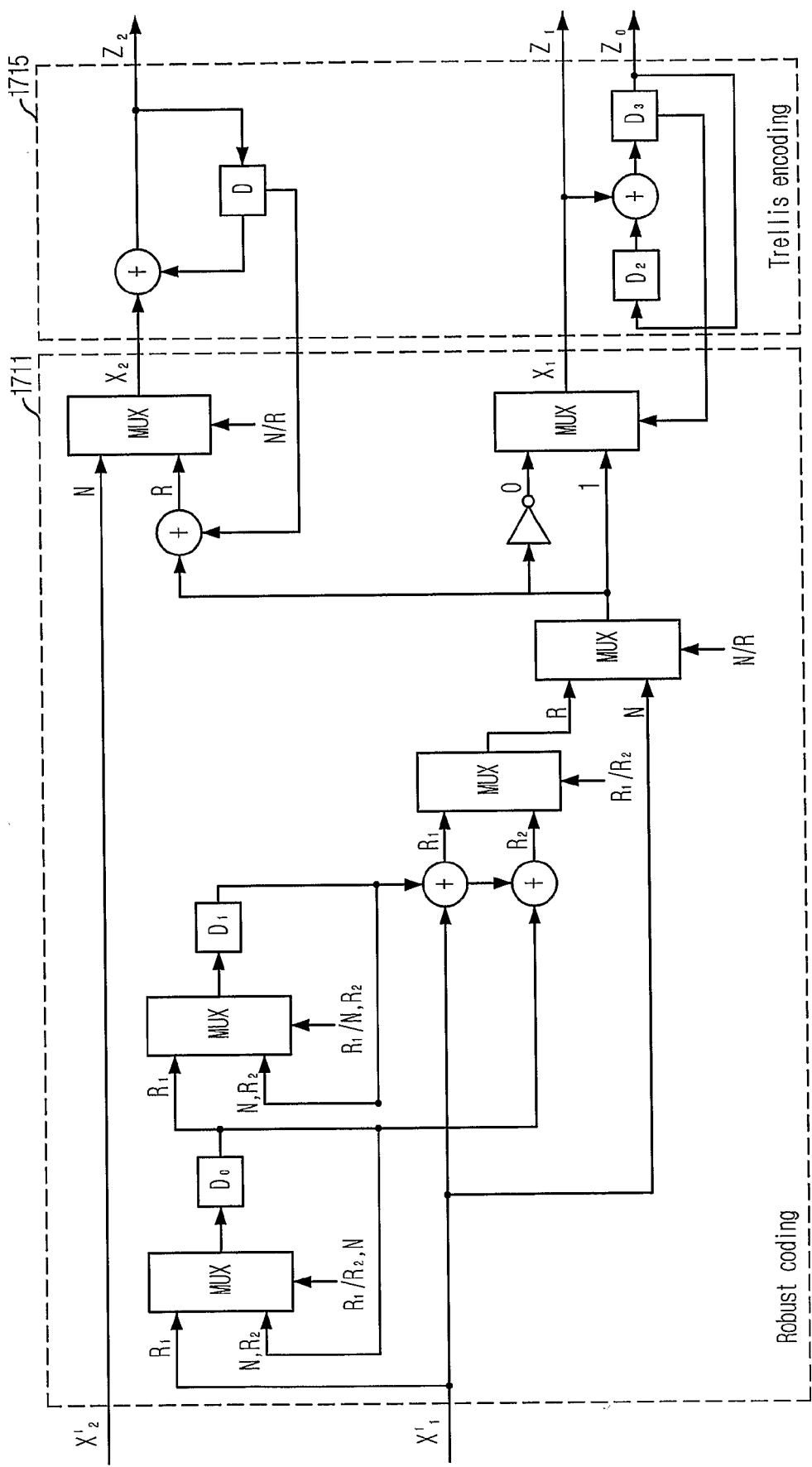
FIG. 17 is a block diagram describing ¼ rate coding applied to the E-4VSB of the ETRI having an output signal of $\{-7,-1,3,5\}$ in accordance with an embodiment of the present invention.

FIG. 17 is a block diagram describing ¼ rate coding applied to the E-4VSB of the ETRI having an output signal of {−7,−1,3,5} in accordance with an embodiment of the present invention.

As illustrated in the drawing, registers D0 and D1 for generating robust data are added to a robust encoder 1711, and input data $X_1'$ are coded by using four registers D0, D1, D2 and D3. When the multiplexer selects an R1 input with respect to the one-bit input data $X_1'$ based on a control bit R1/R2, one symbol is outputted from a trellis encoder 1715 and, when the multiplexer selects an R2 input, another symbol is outputted from the trellis encoder 1715. When the first symbol R1 is generated, the values of the registers D0 and D1 can be changed. However, when the second symbol R2 is generated, the values are maintained. The output signals and subsequent state of the trellis encoder 1715 based on the input data $X_1'$ are as shown in Tables 11 and 12, respectively.

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 11 and 12 to thereby improve the performance of the receiver.

The structure of FIG. 17 also has a case where the positions of the registers D0 and D1 are switched with each other, just as the structures of FIGS. 14 and 15. When the positions of the registers D0 and D1 are switched in FIG. 17, the characteristics can be described based on the following Tables 13 and 14.

TABLE 11

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | 5 | 3 | 5 | 3 | −7 | −1 | −7 | −1 | 5 | 3 | 5 | 3 |
| | R2 | −7 | −1 | −1 | −7 | 3 | 5 | 5 | 3 | 5 | 3 | 3 | 5 | −1 | −7 | −7 | −1 |
| 1 | R1 | 5 | 3 | 5 | 3 | −7 | −1 | −7 | −1 | 5 | 3 | 5 | 3 | −7 | −1 | −7 | −1 |
| | R2 | 3 | 5 | 5 | 3 | −7 | −1 | −1 | −7 | −1 | −7 | −7 | −1 | 5 | 3 | 3 | 5 |

TABLE 12

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 2 | 3 | 1 | 2 | 0 | 1 | 3 | 5 | 7 | 6 | 4 | 7 | 5 | 4 | 6 |
| 1 | 10 | 8 | 9 | 11 | 8 | 10 | 11 | 9 | 15 | 13 | 12 | 14 | 13 | 15 | 14 | 12 |

TABLE 13

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | Current State | | | | | | | | | | | |
| 0 | R1 | -7 | -1 | -7 | -1 | -7 | -1 | -7 | -1 | 5 | 3 | 5 | 3 | 5 | 3 | 5 | 3 |
| | R2 | -7 | -1 | -1 | -7 | 5 | 3 | 3 | 5 | 3 | 5 | 5 | 3 | -1 | -7 | -7 | -1 |
| 1 | R1 | 5 | 3 | 5 | 3 | 5 | 3 | 5 | 3 | -7 | -1 | -7 | -1 | -7 | -1 | -7 | -1 |
| | R2 | 3 | 5 | 5 | 3 | -1 | -7 | -7 | -1 | -7 | -1 | -1 | -7 | 5 | 3 | 3 | 5 |

TABLE 14

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | | | Current State | | | | | | | | | | |
| 0 | 0 | 2 | 3 | 1 | 9 | 11 | 10 | 8 | 2 | 0 | 1 | 3 | 11 | 9 | 8 | 10 |
| 1 | 6 | 4 | 5 | 7 | 15 | 13 | 12 | 14 | 4 | 6 | 7 | 5 | 13 | 15 | 14 | 12 |

Figure 18:
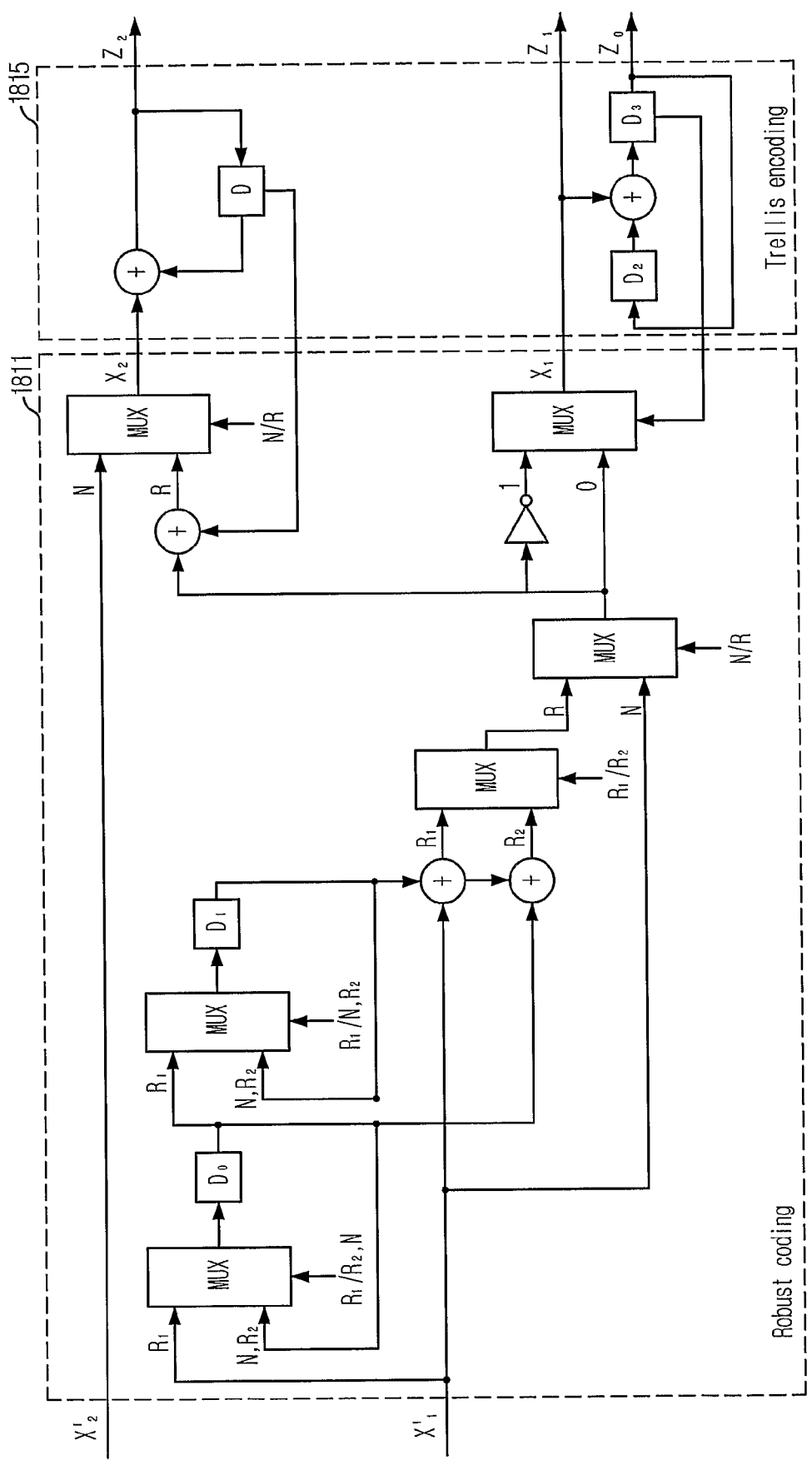
FIG. 18 is a block diagram describing ¼ rate coding applied to the E-4VSB of the ETRI having an output signal of $\{-5,-3,1,7\}$ in accordance with an embodiment of the present invention.

FIG. 18 is a block diagram describing ¼ rate coding applied to the E-4VSB of the ETRI having an output signal of {-5,-3,1,7} in accordance with an embodiment of the present invention.

As illustrated in the drawing, registers D0 and D1 for generating robust data are added to a robust encoder 1811, and input data $X_1'$ are coded by using four registers D0, D1, D2 and D3. When the multiplexer selects an R1 input with respect to the one-bit input data $X_1'$ based on a control bit R1/R2, one symbol is outputted from a trellis encoder 1815 and, when the multiplexer selects an R2 input, another symbol is outputted from the trellis encoder 1815. When the first symbol R1 is generated, the values of the registers D0 and D1 can be changed. However, when the second symbol R2 is generated, the values are maintained. The output signals and subsequent state of the trellis encoder 1815 based on the input data $X_1'$ are as shown in Tables 15 and 16, respectively.

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 15 and 16 to thereby improve the performance of the receiver.

The structure of FIG. 18 also has a case where the positions of the registers D0 and D1 are switched with each other, just as the structures of FIGS. 14 and 15. When the positions of the registers D0 and D1 are switched in FIG. 18, the characteristics can be described based on the following Tables 17 and 18.

TABLE 15

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | | Current State | | | | | | | | | | |
| 0 | R1 | -3 | -5 | -3 | -5 | 1 | 7 | 1 | 7 | -3 | -5 | -3 | -5 | 1 | 7 | 1 | 7 |
| | R2 | -5 | -3 | -3 | -5 | 1 | 7 | 7 | 1 | 7 | 1 | 1 | 7 | -3 | -5 | -5 | -3 |
| 1 | R1 | 1 | 7 | 1 | 7 | -3 | -5 | -3 | -5 | 1 | 7 | 1 | 7 | -3 | -5 | -3 | -5 |
| | R2 | 1 | 7 | 7 | 1 | -5 | -3 | -3 | -5 | -3 | -5 | -5 | -3 | 7 | 1 | 1 | 7 |

TABLE 16

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | | | Current State | | | | | | | | | | |
| 0 | 2 | 0 | 1 | 3 | 0 | 2 | 3 | 1 | 7 | 5 | 4 | 6 | 5 | 7 | 6 | 4 |
| 1 | 8 | 10 | 11 | 9 | 10 | 8 | 9 | 11 | 13 | 15 | 14 | 12 | 15 | 13 | 12 | 14 |

TABLE 17

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | Current State | | | | | | | | | | | |
| 0 | R1 | -3 | -5 | -3 | -5 | -3 | -5 | -3 | -5 | 1 | 7 | 1 | 7 | 1 | 7 | 1 | 7 |
| | R2 | -5 | -3 | -3 | -5 | 7 | 1 | 1 | 7 | 1 | 7 | 7 | 1 | -3 | -5 | -5 | -3 |
| 1 | R1 | 1 | 7 | 1 | 7 | 1 | 7 | 1 | 7 | -3 | -5 | -3 | -5 | -3 | -5 | -3 | -5 |
| | R2 | 1 | 7 | 7 | 1 | -3 | -5 | -5 | -3 | -5 | -3 | -3 | -5 | 7 | 1 | 1 | 7 |

TABLE 18

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | | | Current State | | | | | | | | | | |
| 0 | 2 | 0 | 1 | 3 | 11 | 9 | 8 | 10 | 0 | 2 | 3 | 1 | 9 | 11 | 10 | 8 |
| 1 | 4 | 6 | 7 | 5 | 13 | 15 | 14 | 12 | 6 | 4 | 5 | 7 | 15 | 13 | 12 | 14 |

Figure 19:
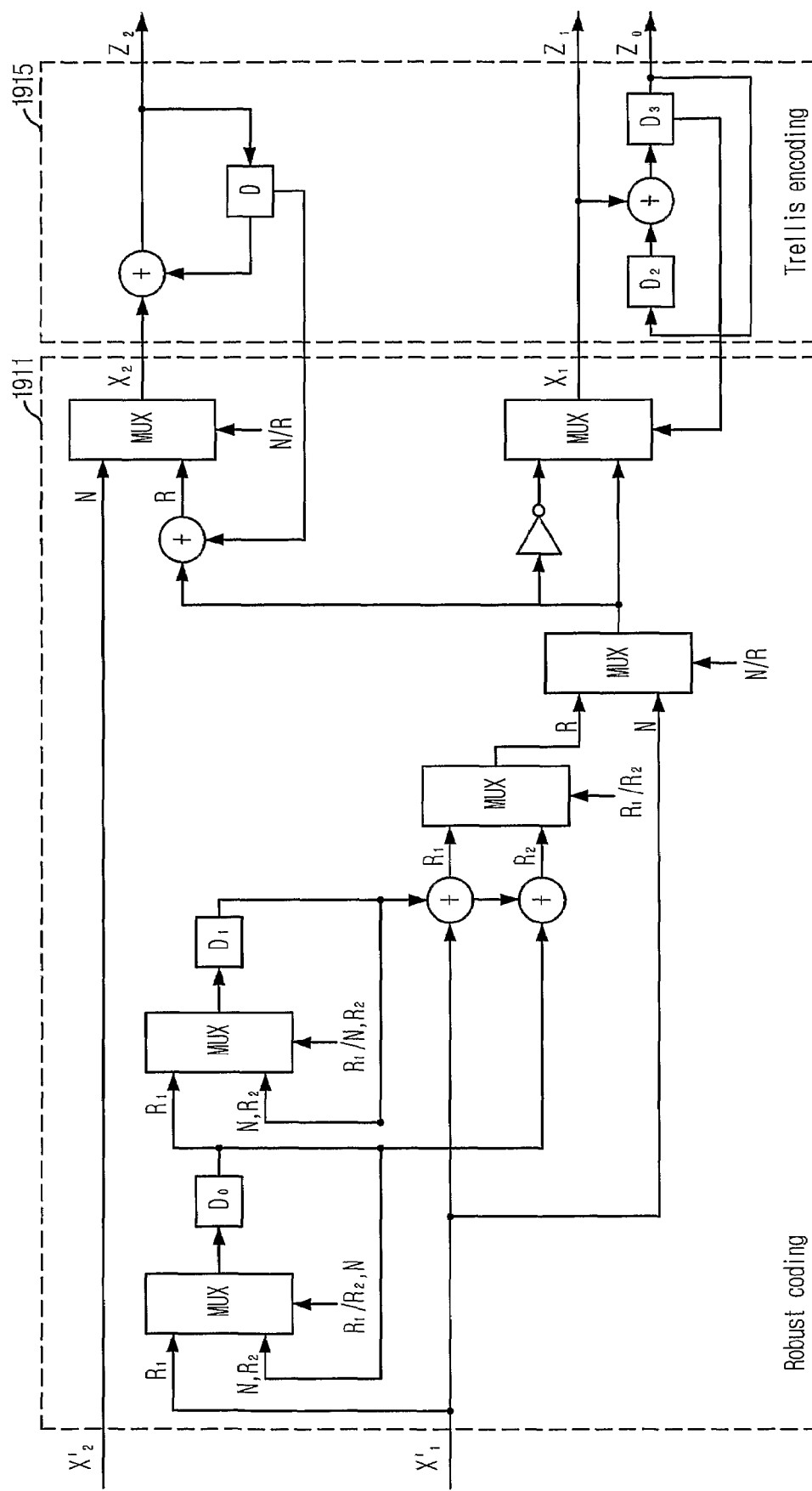
FIG. 19 is a block diagram describing ¼ rate coding applied to the E-4VSB of the ETRI having an output signal of $\{-7,-1,3,5\}$ and $\{-5,-3,1,7\}$ optionally in accordance with an embodiment of the present invention.

FIG. 19 is a block diagram describing ¼ rate coding applied to the E-4VSB of the ETRI having an output signal of {-7,-1,3,5} and {-5,-3,1,7} optionally in accordance with an embodiment of the present invention.

As illustrated in the drawing, registers D0 and D1 for generating robust data are added to a robust encoder 1911, and input data $X_1'$ are coded by using four registers D0, D1, D2 and D3. When the multiplexer selects an R1 input with respect to the one-bit input data $X_1'$ based on a control bit R1/R2, one symbol is outputted from a trellis encoder 1915 and, when the multiplexer selects an R2 input, another symbol is outputted from the trellis encoder 1915. When the first symbol R1 is generated, the values of the registers D0 and D1 can be changed. However, when the second symbol R2 is generated, the values are maintained. When the first symbol R1 is coded to be mapped to one of {-7,-1,3,5} and the second symbol is coded to be mapped to one of {-5,-3,1,7}, the output signals and subsequent state of the trellis encoder 1915 based on the input data $X_1'$ are as shown in Tables 19 and 20, respectively.

TABLE 19

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | Current State | | | | | | | | | | | |
| 0 | R1 | -7 | -1 | -7 | -1 | 5 | 3 | 5 | 3 | -7 | -1 | -7 | -1 | 5 | 3 | 5 | 3 |
| | R2 | -3 | -5 | -5 | -3 | 7 | 1 | 1 | 7 | 1 | 7 | 7 | 1 | -5 | -3 | -3 | -5 |
| 1 | R1 | 5 | 3 | 5 | 3 | -7 | -1 | -7 | -1 | 5 | 3 | 5 | 3 | -7 | -1 | -7 | -1 |
| | R2 | 7 | 1 | 1 | 7 | -3 | -5 | -5 | -3 | -5 | -3 | -3 | -5 | 1 | 7 | 7 | 1 |

TABLE 20

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | | | Current State | | | | | | | | | | |
| 0 | 1 | 3 | 2 | 0 | 3 | 1 | 0 | 2 | 4 | 6 | 7 | 5 | 6 | 4 | 5 | 7 |
| 1 | 11 | 9 | 8 | 10 | 9 | 11 | 10 | 8 | 14 | 12 | 13 | 15 | 12 | 14 | 15 | 13 |

Conversely, when the first symbol R1 is coded to be mapped to one of {-5,-3,1,7} and the second symbol is coded to be mapped to one of {-7,-1,3,5}, the output signals and subsequent state of the trellis encoder 1915 based on the input data $X_1'$ are as shown in Tables 21 and 22, respectively.

TABLE 21

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | Current State | | | | | | | | | | | |
| 0 | R1 | -3 | -5 | -3 | -5 | 1 | 7 | 1 | 7 | -3 | -5 | -3 | -5 | 1 | 7 | 1 | 7 |
| | R2 | -1 | -7 | -7 | -1 | 5 | 3 | 3 | 5 | 3 | 5 | 5 | 3 | -7 | -1 | -1 | -7 |
| 1 | R1 | 1 | 7 | 1 | 7 | -3 | -5 | -3 | -5 | 1 | 7 | 1 | 7 | -3 | -5 | -3 | -5 |
| | R2 | 5 | 3 | 3 | 5 | -1 | -7 | -7 | -1 | -7 | -1 | -1 | -7 | 3 | 5 | 5 | 3 |

TABLE 22

| | Current State | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| 0 | 3 | 1 | 0 | 2 | 1 | 3 | 2 | 0 | 6 | 4 | 5 | 7 | 4 | 6 | 7 | 5 |
| 1 | 9 | 11 | 10 | 8 | 11 | 9 | 8 | 10 | 12 | 14 | 15 | 13 | 14 | 12 | 13 | 15 |

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 19, 20, 21 and 22 to thereby improve the performance of the receiver.

The structure of FIG. 19 also has a case where the positions of the registers D0 and D1 are switched with each other, just as the structures of FIGS. 14 and 15. When the positions of the registers D0 and D1 are switched in FIG. 19, the characteristics can be described based on the following Tables 23, 24, 25 and 26. Tables 23 and 24 show a case where the first symbol R1 is coded to be mapped to one of {−7,−1,3,5} and the second symbol R2 is coded to be mapped to one of {−5,−3, 1,7}, respectively. Tables 25 and 26 show a case where the first symbol R1 is coded to be mapped to one of {−5,−3,1,7} and the second symbol R2 is coded to be mapped to one of {−7,−1,3,5}, respectively.

TABLE 23

| | | Current State | | | | | | | | | | | | | | | |
|---|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | −7 | −1 | −7 | −1 | 5 | 3 | 5 | 3 | 5 | 3 | 5 | 3 |
| | R2 | −3 | −5 | −5 | −3 | 1 | 7 | 7 | 1 | 7 | 1 | 1 | 7 | −5 | −3 | −3 | −5 |
| 1 | R1 | 5 | 3 | 5 | 3 | 5 | 3 | 5 | 3 | −7 | −1 | −7 | −1 | −7 | −1 | −7 | −1 |
| | R2 | 7 | 1 | 1 | 7 | −5 | −3 | −3 | −5 | −3 | −5 | −5 | −3 | 1 | 7 | 7 | 1 |

TABLE 24

| | Current State | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| 0 | 1 | 3 | 2 | 0 | 8 | 10 | 11 | 9 | 3 | 1 | 0 | 2 | 10 | 8 | 9 | 11 |
| 1 | 7 | 5 | 4 | 6 | 14 | 12 | 13 | 15 | 5 | 7 | 6 | 4 | 12 | 14 | 15 | 13 |

TABLE 25

| | | Current State | | | | | | | | | | | | | | | |
|---|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 10 | R1 | −3 | −5 | −3 | −5 | −3 | −5 | −3 | −5 | 1 | 7 | 1 | 7 | 1 | 7 | 1 | 7 |
| 7 | R2 | −1 | −7 | −7 | −1 | 3 | 5 | 5 | 3 | 5 | 3 | 3 | 5 | −7 | −1 | −1 | −7 |
| 1 | R1 | 1 | 7 | 1 | 7 | 1 | 7 | 1 | 7 | −3 | −5 | −3 | −5 | −3 | −5 | −3 | −5 |
| | R2 | 5 | 3 | 3 | 5 | −7 | −1 | −1 | −7 | −1 | −7 | −7 | −1 | 3 | 5 | 5 | 3 |

TABLE 26

| | Current State | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| 0 | 3 | 1 | 0 | 2 | 10 | 8 | 9 | 11 | 1 | 3 | 2 | 0 | 8 | 10 | 11 | 9 |
| 1 | 5 | 7 | 6 | 4 | 12 | 14 | 15 | 13 | 7 | 5 | 4 | 6 | 14 | 12 | 13 | 15 |

Figure 20:
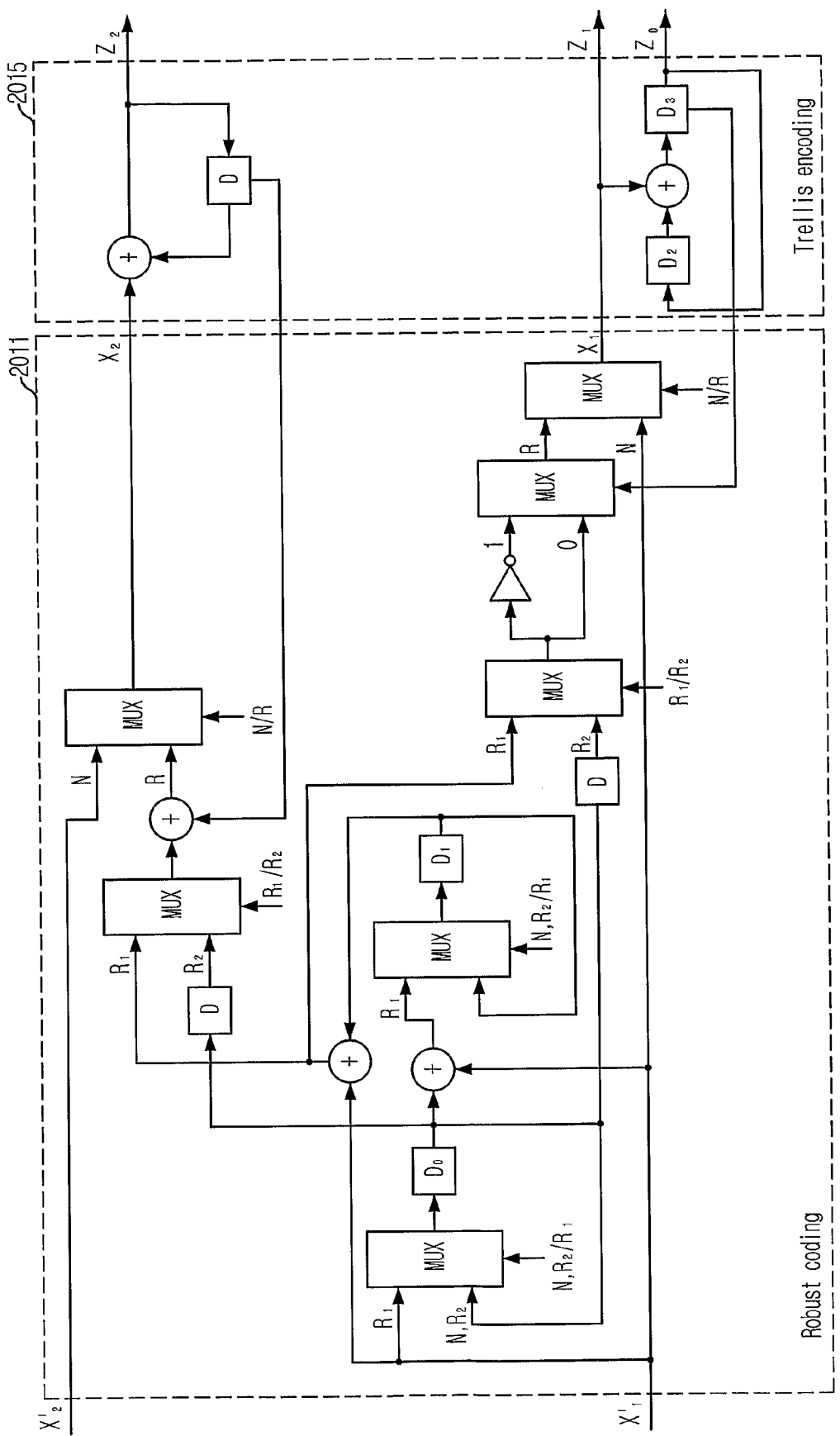
FIG. 20 is a block diagram describing ¼ rate coding applied to the E-4VSB of the ETRI having an output signal of $\{-7,-1,3,5\}$ in accordance with another embodiment of the present invention.

FIG. 20 is a block diagram describing ¼ rate coding applied to the E-4VSB of the ETRI having an output signal of {−7,−1,3,5} in accordance with another embodiment of the present invention.

As illustrated in the drawing, registers D0 and D1 for generating robust data are added to a robust encoder 2011 and input data $X_1'$ are coded by using four registers D0, D1, D2 and D3. When the multiplexer selects an R1 input with respect to the one-bit input data $X_1'$ based on a control bit R1/R2, one symbol is outputted from a trellis encoder 2015 and, when the multiplexer selects an R2 input, another symbol is outputted from the trellis encoder 2015. When the first symbol R1 is generated, the values of the registers D0 and D1 can be changed. However, when the second symbol R2 is generated, the values are maintained. The output signals and subsequent state of the trellis encoder 2015 based on the input data $X_1'$ are as shown in Tables 27 and 28, respectively.

TABLE 27

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | 5 | 3 | 5 | 3 | −7 | −1 | −7 | −1 | 5 | 3 | 5 | 3 |
| | R2 | −7 | −1 | −1 | −7 | −1 | −7 | −7 | −1 | 5 | 3 | 3 | 5 | 3 | 5 | 5 | 3 |
| 1 | R1 | 5 | 3 | 5 | 3 | −7 | −1 | −7 | −1 | 5 | 3 | 5 | 3 | −7 | −1 | −7 | −1 |
| | R2 | −1 | −7 | −7 | −1 | −7 | −1 | −1 | −7 | 3 | 5 | 5 | 3 | 5 | 3 | 3 | 5 |

TABLE 28

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 2 | 3 | 1 | 3 | 1 | 0 | 2 | 5 | 7 | 6 | 4 | 6 | 4 | 5 | 7 |
| 1 | 15 | 13 | 12 | 14 | 12 | 14 | 15 | 13 | 10 | 8 | 9 | 11 | 9 | 11 | 10 | 8 |

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 11 and 12 to thereby improve the performance of the receiver.

The structure of FIG. 20 also has a case where the positions of the registers D0 and D1 are switched with each other, just as the structures of FIGS. 14 and 15. When the positions of the registers D0 and D1 are switched in FIG. 20, the characteristics can be described based on the following Tables 29 and 30.

TABLE 29

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | −7 | −1 | −7 | −1 | 5 | 3 | 5 | 3 | 5 | 3 | 5 | 3 |
| | R2 | −7 | −1 | −1 | −7 | 5 | 3 | 3 | 5 | −1 | −7 | −7 | −1 | 3 | 5 | 5 | 3 |
| 1 | R1 | 5 | 3 | 5 | 3 | 5 | 3 | 5 | 3 | −7 | −1 | −7 | −1 | −7 | −1 | −7 | −1 |
| | R2 | −1 | −7 | −7 | −1 | 3 | 5 | 5 | 3 | −7 | −1 | −1 | −7 | 5 | 3 | 3 | 5 |

TABLE 30

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 2 | 3 | 1 | 9 | 11 | 10 | 8 | 3 | 1 | 0 | 2 | 10 | 8 | 9 | 11 |
| 1 | 15 | 13 | 12 | 14 | 6 | 4 | 5 | 7 | 12 | 14 | 15 | 13 | 5 | 7 | 6 | 4 |

Figure 21:
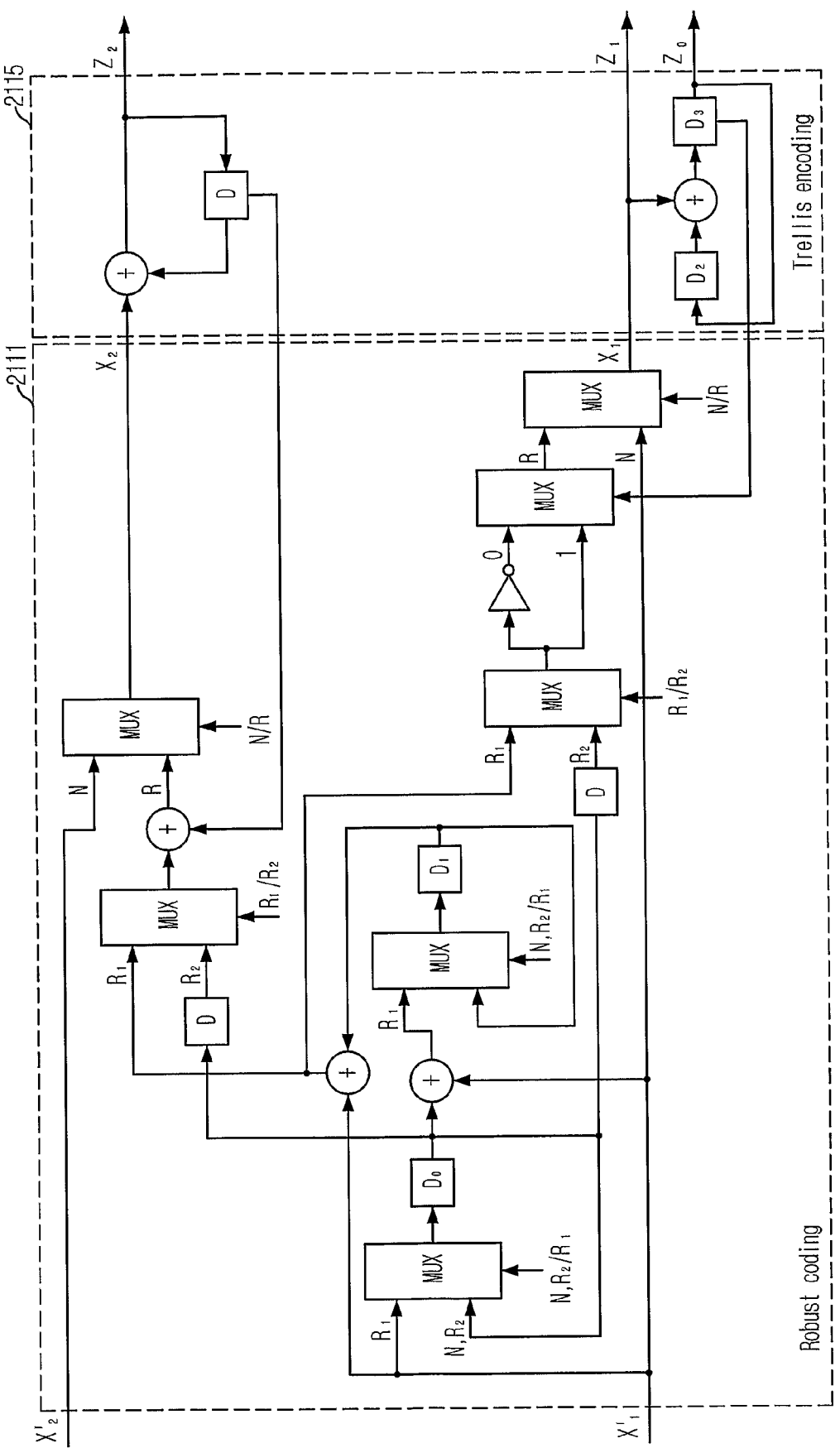
FIG. 21 is a block diagram describing ¼ rate coding applied to the E-4VSB of the ETRI having an output signal of $\{-5,-3,1,7\}$ in accordance with another embodiment of the present invention.

FIG. 21 is a block diagram describing ¼ rate coding applied to the E-4VSB of the ETRI having an output signal of {−5,−3,1,7} in accordance with another embodiment of the present invention.

As illustrated in the drawing, registers D0 and D1 for generating robust data are added to a robust encoder 2111, and input data $X_1'$ are coded by using four registers D0, D1, D2 and D3. When the multiplexer selects an R1 input with respect to the one-bit input data $X_1'$ based on a control bit R1/R2, one symbol is outputted from a trellis encoder 2115 and, when the multiplexer selects an R2 input, another symbol is outputted from the trellis encoder 2115. When the first symbol R1 is generated, the values of the registers D0 and D1 can be changed. However, when the second symbol R2 is generated, the values are maintained. The output signals and subsequent state of the trellis encoder 2115 based on the input data $X_1'$ are as shown in Tables 31 and 32, respectively.

TABLE 31

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | | Current State | | | | | | | | | | |
| 0 | R1 | −3 | −5 | −3 | −5 | 1 | 7 | 1 | 7 | −3 | −5 | −3 | −5 | 1 | 7 | 1 | 7 |
| | R2 | −5 | −3 | −3 | −5 | −3 | −5 | −5 | −3 | 7 | 1 | 1 | 7 | 1 | 7 | 7 | 1 |
| 1 | R1 | 1 | 7 | 1 | 7 | −3 | −5 | −3 | −5 | 1 | 7 | 1 | 7 | −3 | −5 | −3 | −5 |
| | R2 | −3 | −5 | −5 | −3 | −5 | −3 | −3 | −5 | 1 | 7 | 7 | 1 | 7 | 1 | 1 | 7 |

TABLE 32

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | | | | Current State | | | | | | | | | |
| 0 | 2 | 0 | 1 | 3 | 1 | 3 | 2 | 0 | 7 | 5 | 4 | 6 | 4 | 6 | 7 | 5 |
| 1 | 13 | 15 | 14 | 12 | 14 | 12 | 13 | 15 | 8 | 10 | 11 | 9 | 11 | 9 | 8 | 10 |

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 31 and 32 to thereby improve the performance of the receiver.

The structure of FIG. 21 also has a case where the positions of the registers D0 and D1 are switched with each other, just as the structures of FIGS. 14 and 15. When the positions of the registers D0 and D1 are switched in FIG. 17, the characteristics can be described based on the following Tables 33 and 34.

TABLE 33

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | | | | | | | Current State | | | | | | | | | |
| 0 | R1 | −3 | −5 | −3 | −5 | −3 | −5 | −3 | −5 | 1 | 7 | 1 | 7 | 1 | 7 | 1 | 7 |
| | R2 | −5 | −3 | −3 | −5 | 7 | 1 | 1 | 7 | −3 | −5 | −5 | −3 | 1 | 7 | 7 | 1 |
| 1 | R1 | 1 | 7 | 1 | 7 | 1 | 7 | 1 | 7 | −3 | −5 | −3 | −5 | −3 | −5 | −3 | −5 |
| | R2 | −3 | −5 | −5 | −3 | 1 | 7 | 7 | 1 | −5 | −3 | −3 | −5 | 7 | 1 | 1 | 7 |

TABLE 34

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | | | | | Current State | | | | | | | | |
| 0 | 2 | 0 | 1 | 3 | 11 | 9 | 8 | 10 | 1 | 3 | 2 | 0 | 8 | 10 | 11 | 9 |
| 1 | 13 | 15 | 14 | 12 | 4 | 6 | 7 | 5 | 14 | 12 | 13 | 15 | 7 | 5 | 4 | 6 |

Figure 22:
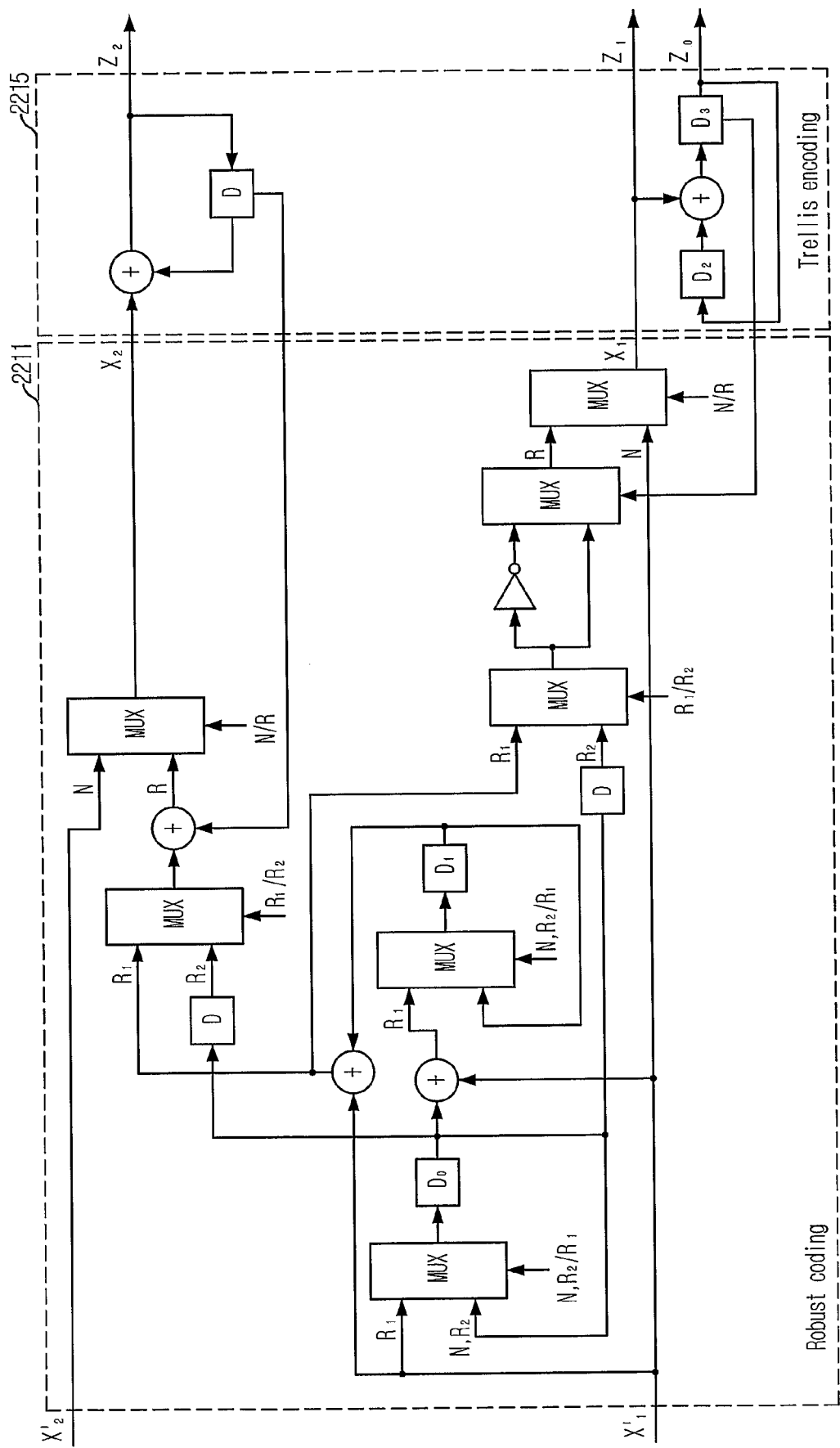
FIG. 22 is a block diagram describing ¼ rate coding applied to the E-4VSB of the ETRI having an output signal of $\{-7,-1,3,5\}$ and $\{-5,-3,1,7\}$ optionally in accordance with another embodiment of the present invention.

FIG. 22 is a block diagram describing ¼ rate coding applied to the E-4VSB of the ETRI having an output signal of {−7,−1,3,5} and {−5,−3,1,7} optionally in accordance with another embodiment of the present invention.

As illustrated in the drawing, registers D0 and D1 for generating robust data are added to a robust encoder 2211, and input data $X_1'$ are coded by using four registers D0, D1, D2 and D3. When the multiplexer selects an R1 input with respect to the one-bit input data $X_1'$ based on a control bit R1/R2, one symbol is outputted from a trellis encoder 2215 and, when the multiplexer selects an R2 input, another symbol is outputted from the trellis encoder 2215. When the first symbol R1 is generated, the values of the registers D0 and D1 can be changed. However, when the second symbol R2 is generated, the values are maintained. When the first symbol R1 is coded to be mapped to one of {−7,−1,3,5} and the second symbol R2 is coded to be mapped to one of {−5,−3, 1,7}, the output signals and subsequent state of the trellis encoder 2215 based on the input data $X_1'$ are as shown in Tables 35 and 36, respectively.

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 35, 36, 37 and 38 to thereby improve the performance of the receiver.

The structure of FIG. 22 also has a case where the positions of the registers D0 and D1 are switched with each other, just as the structures of FIGS. 14 and 15. When the positions of the registers D0 and D1 are switched in FIG. 22, the characteristics can be described based on the following Tables 39, 40, 41 and 42.

Tables 39 and 40 show a case where the first symbol R1 is coded to be mapped to one of {−7,−1,3,5} and the second

TABLE 35

| | | Current State | | | | | | | | | | | | | | | |
|---|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | 5 | 3 | 5 | 3 | −7 | −1 | −7 | −1 | 5 | 3 | 5 | 3 |
|   | R2 | −3 | −5 | −5 | −3 | −5 | −3 | −3 | −5 | 1 | 7 | 7 | 1 | 7 | 1 | 1 | 7 |
| 1 | R1 | 5 | 3 | 5 | 3 | −7 | −1 | −7 | −1 | 5 | 3 | 5 | 3 | −7 | −1 | −7 | −1 |
|   | R2 | −5 | −3 | −3 | −5 | −3 | −5 | −5 | −3 | 7 | 1 | 1 | 7 | 1 | 7 | 7 | 1 |

TABLE 36

| | Current State | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| 0 | 1 | 3 | 2 | 0 | 2 | 0 | 1 | 3 | 4 | 6 | 7 | 5 | 7 | 5 | 4 | 6 |
| 1 | 14 | 12 | 13 | 15 | 13 | 15 | 14 | 12 | 11 | 9 | 8 | 10 | 8 | 10 | 11 | 9 |

Conversely, when the first symbol R1 is coded to be mapped to one of {−5,−3,1,7} and the second symbol is coded to be mapped to one of {−7,−1,3,5}, the output signals and subsequent state of the trellis encoder 2215 based on the input data $X_1'$ are as shown in Tables 37 and 38, respectively.

symbol R2 is coded to be mapped to one of {−5,−3,1,7}, respectively. Tables 41 and 42 show a case where the first symbol R1 is coded to be mapped to one of {−5,−3,1,7} and the second symbol R2 is coded to be mapped to one of {−7,−1,3,5}, respectively.

TABLE 37

| | | Current State | | | | | | | | | | | | | | | |
|---|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | R1 | −3 | −5 | −3 | −5 | 1 | 7 | 1 | 7 | −3 | −5 | −3 | −5 | 1 | 7 | 1 | 7 |
|   | R2 | −1 | −7 | −7 | −1 | −7 | −1 | −1 | −7 | 3 | 5 | 5 | 3 | 5 | 3 | 3 | 5 |
| 1 | R1 | 1 | 7 | 1 | 7 | −3 | −5 | −3 | −5 | 1 | 7 | 1 | 7 | −3 | −5 | −3 | −5 |
|   | R2 | −7 | −1 | −1 | −7 | −1 | −7 | −7 | −1 | 5 | 3 | 3 | 5 | 3 | 5 | 5 | 3 |

TABLE 38

| | Current State | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| 0 | 3 | 1 | 0 | 2 | 0 | 2 | 3 | 1 | 6 | 4 | 5 | 7 | 5 | 7 | 6 | 4 |
| 1 | 12 | 14 | 15 | 13 | 15 | 13 | 12 | 14 | 9 | 11 | 10 | 8 | 10 | 8 | 9 | 11 |

TABLE 39

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | −7 | −1 | −7 | 1 | 5 | 3 | 5 | 3 | 5 | 3 | 5 | 3 |
| | R2 | −3 | −5 | −5 | −3 | 1 | 7 | 7 | 1 | −5 | −3 | −3 | −5 | 7 | 1 | 1 | 7 |
| 1 | R1 | 5 | 3 | 5 | 3 | 5 | 3 | 5 | 3 | −7 | −1 | −7 | −1 | −7 | −1 | −7 | −1 |
| | R2 | −5 | −3 | −3 | −5 | 7 | 1 | 1 | 7 | −3 | −5 | −5 | −3 | 1 | 7 | 7 | 1 |

TABLE 40

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 1 | 3 | 2 | 0 | 8 | 10 | 11 | 9 | 2 | 0 | 1 | 3 | 11 | 9 | 8 | 10 |
| 1 | 14 | 12 | 13 | 15 | 7 | 5 | 4 | 6 | 13 | 15 | 14 | 12 | 4 | 6 | 7 | 5 |

TABLE 41

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −3 | −5 | −3 | −5 | −3 | −5 | −3 | −5 | 1 | 7 | 1 | 7 | 1 | 7 | 1 | 7 |
| | R2 | −1 | −7 | −7 | −1 | 3 | 5 | 5 | 3 | −7 | −1 | −1 | −7 | 5 | 3 | 3 | 5 |
| 1 | R1 | 1 | 7 | 1 | 7 | 1 | 7 | 1 | 7 | −3 | −5 | −3 | −5 | −3 | −5 | −3 | −5 |
| | R2 | −7 | −1 | −1 | −7 | 5 | 3 | 3 | 5 | −1 | −7 | −7 | −1 | 3 | 5 | 5 | 3 |

TABLE 42

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 3 | 1 | 0 | 2 | 10 | 8 | 9 | 11 | 0 | 2 | 3 | 1 | 9 | 11 | 10 | 8 |
| 1 | 12 | 14 | 15 | 13 | 5 | 7 | 6 | 4 | 15 | 13 | 12 | 14 | 6 | 4 | 5 | 7 |

Figure 23:
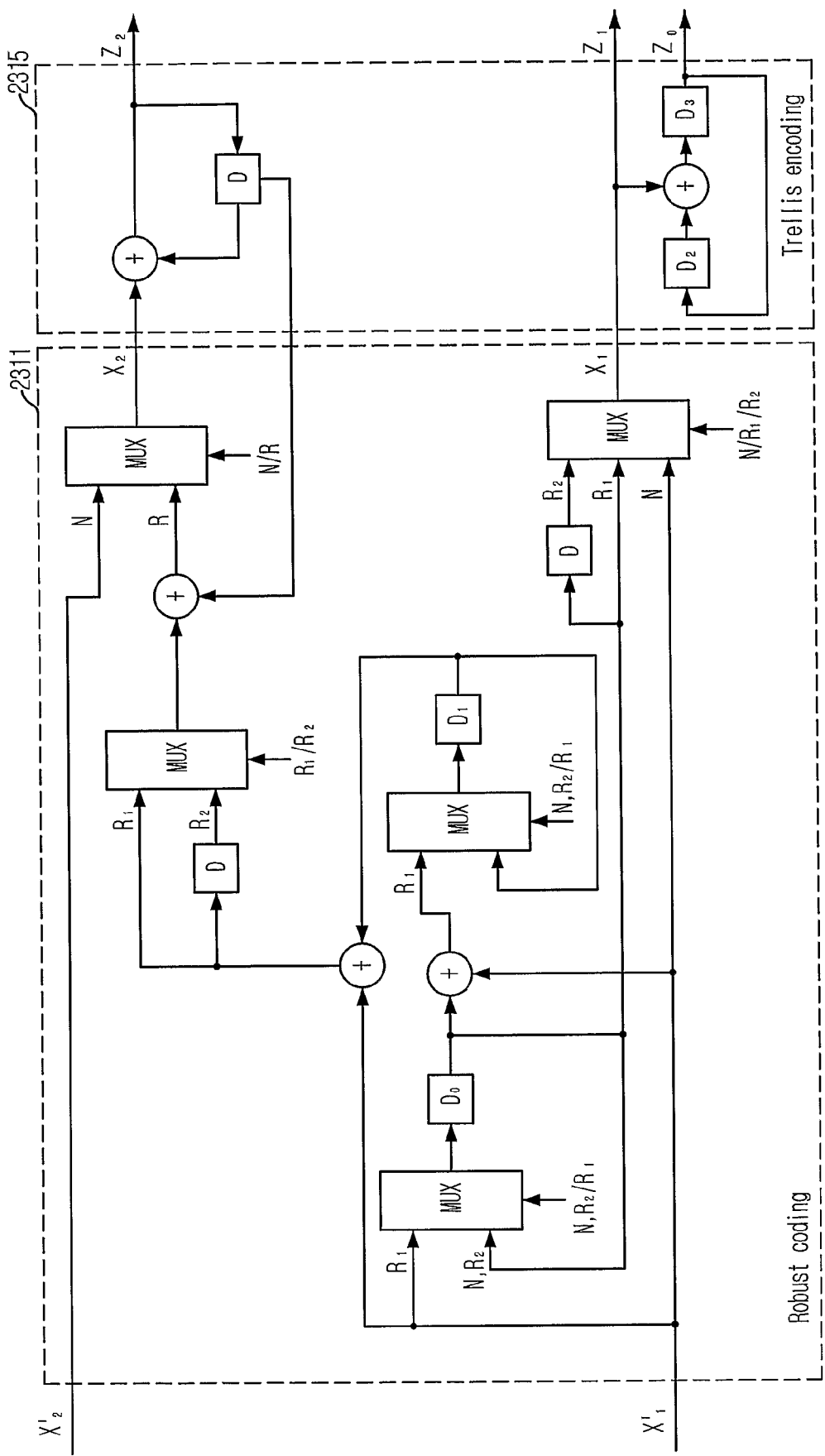
FIG. 23 is a block diagram describing ¼ rate coding applied to the E-8VSB of the ETRI in accordance with an embodiment of the present invention.

FIG. 23 is a block diagram describing ¼ rate coding applied to the E-8VSB of the ETRI in accordance with an embodiment of the present invention.

As illustrated, input data $X_1'$ are coded by using four registers D0, D1, D2 and D3 of a robust encoder 2311. When the multiplexer selects an R1 input with respect to the one-bit input data $X_1'$ based on a control bit R1/R2, one symbol is outputted from a trellis encoder 2315 and, when the multiplexer selects an R2 input, another symbol is outputted from the trellis encoder 2315. When the first symbol R1 is generated, the values of the registers D0 and D1 can be changed. However, when the second symbol R2 is generated, the values are maintained. The data $X_1$ and $X_2$ generated from the input data $X_1'$ are used as input data for the trellis encoder 2315 for generating the first symbol R1, and they are used as input data for the trellis encoder 2315 for generating the next second symbol R2 after being stored in a memory. The output signals and subsequent state of the trellis encoder 2315 based on the input data $X_1'$ are as shown in Tables 43 and 44, respectively.

TABLE 43

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −5 | −7 | −5 | 1 | 3 | 1 | 3 | −3 | −1 | −3 | −1 | 5 | 7 | 5 | 7 |
| | R2 | −7 | −7 | −5 | −5 | 1 | 1 | 3 | 3 | −1 | −1 | −3 | −3 | 7 | 7 | 5 | 5 |
| 1 | R1 | 1 | 3 | 1 | 3 | −7 | −5 | −7 | −5 | 5 | 7 | 5 | 7 | −3 | −1 | −3 | −1 |
| | R2 | 1 | 1 | 3 | 3 | −7 | −7 | −5 | −5 | 7 | 7 | 5 | 5 | −1 | −1 | −3 | −3 |

TABLE 44

| Input | \multicolumn{16}{c}{Current State} |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 0 | 1 | 2 | 3 | 7 | 6 | 5 | 4 | 7 | 6 | 5 | 4 |
| 1 | 12 | 13 | 14 | 15 | 12 | 13 | 14 | 15 | 11 | 10 | 9 | 8 | 11 | 10 | 9 | 8 |

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 43 and 44 to thereby improve the performance of the receiver.

The structure of FIG. 23 also has a case where the positions of the registers D0 and D1 are switched with each other, just as the structures of FIGS. 14 and 15. When the positions of the registers D0 and D1 are switched in FIG. 23, the characteristics can be described based on the following Tables 45 and 46.

TABLE 45

| Input | | \multicolumn{16}{c}{Current State} |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −5 | −7 | −5 | −3 | −1 | −3 | −1 | 1 | 3 | 1 | 3 | 5 | 7 | 5 | 7 |
| | R2 | −7 | −7 | −5 | −5 | −1 | −1 | −3 | −3 | 1 | 1 | 3 | 3 | 7 | 7 | 5 | 5 |
| 1 | R1 | 1 | 3 | 1 | 3 | 5 | 7 | 5 | 7 | −7 | −5 | −7 | −5 | −3 | −1 | −3 | −1 |
| | R2 | 1 | 1 | 3 | 3 | 7 | 7 | 5 | 5 | −7 | −7 | −5 | −5 | −1 | −1 | −3 | −3 |

TABLE 46

| Input | \multicolumn{16}{c}{Current State} |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 11 | 10 | 9 | 8 | 0 | 1 | 2 | 3 | 11 | 10 | 9 | 8 |
| 1 | 12 | 13 | 14 | 15 | 7 | 6 | 5 | 4 | 12 | 13 | 14 | 15 | 7 | 6 | 5 | 4 |

Figure 24:
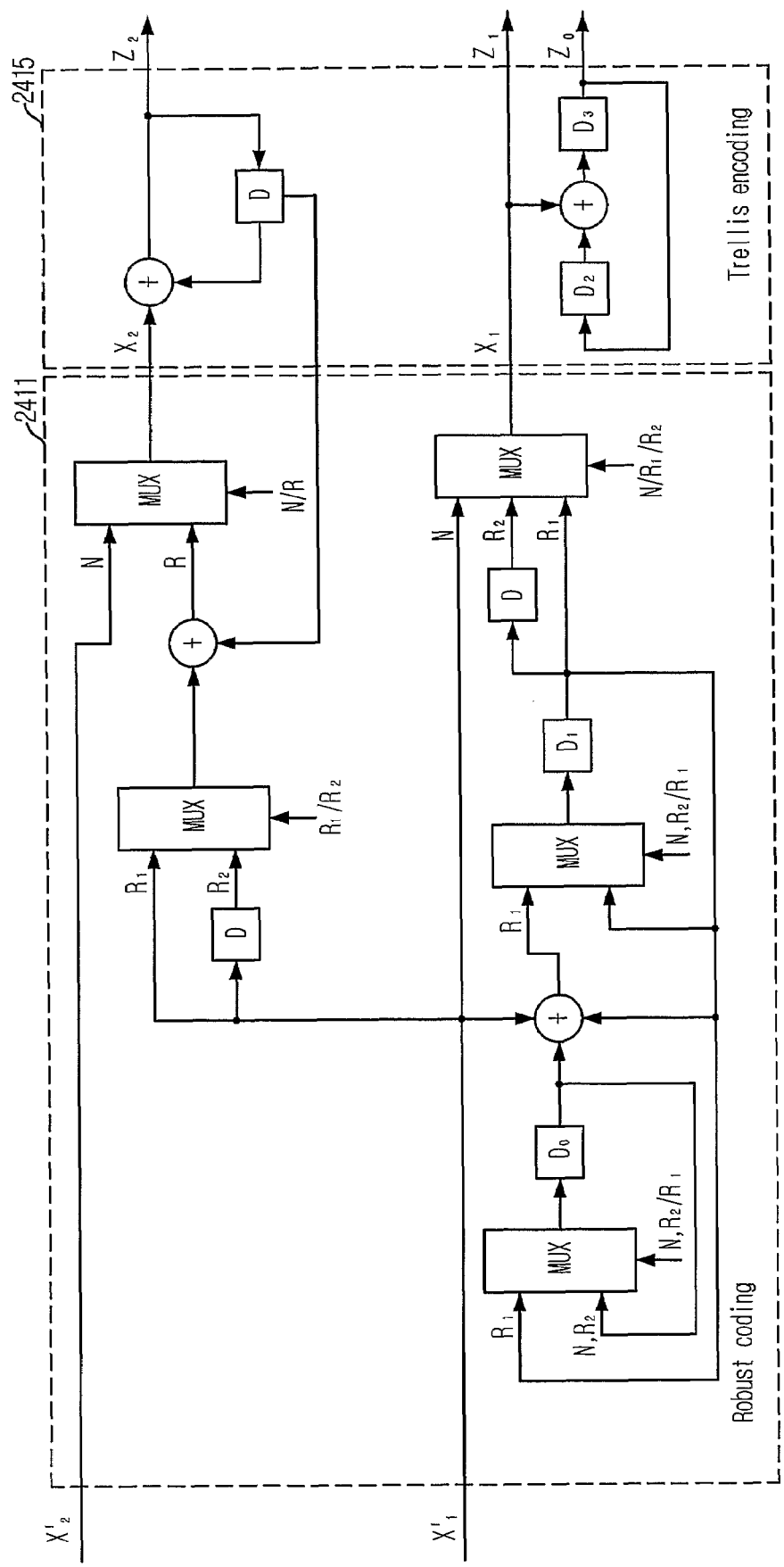
FIG. 24 is a block diagram describing ¼ rate coding applied to the E-8VSB of the ETRI in accordance with another embodiment of the present invention.

FIG. 24 is a block diagram describing ¼ rate coding applied to the E-8VSB of the ETRI in accordance with another embodiment of the present invention.

As illustrated, input data $X_1'$ are coded by using four registers D0, D1, D2 and D3 of a robust encoder 2411. When the multiplexer selects an R1 input with respect to one-bit input data $X_1'$ based on a control bit R1/R2, one symbol is outputted from a trellis encoder 2415 and, when the multiplexer selects an R2 input, another symbol is outputted from the trellis encoder 2415. When the first symbol R1 is generated, the values of the registers D0 and D1 can be changed. However, when the second symbol R2 is generated, the values are maintained. The data $X_1$ and $X_2$ generated from the input data $X_1'$ are used as input data for the trellis encoder 2415 for generating the first symbol R1, and they are used as input data for the trellis encoder 2415 for generating the next second symbol R2 after being stored in a memory. The output signals and subsequent state of the trellis encoder 2415 based on the input data $X_1'$ are as shown in Tables 47 and 48, respectively.

TABLE 47

| Input | | \multicolumn{16}{c}{Current State} |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −5 | −7 | −5 | −3 | −1 | −3 | −1 | −7 | −5 | −7 | −5 | −3 | −1 | −3 | −1 |
| | R2 | −7 | −7 | −5 | −5 | −1 | −1 | −3 | −3 | −7 | −7 | −5 | −5 | −1 | −1 | −3 | −3 |
| 1 | R1 | 1 | 3 | 1 | 3 | 5 | 7 | 5 | 7 | 1 | 3 | 1 | 3 | 5 | 7 | 5 | 7 |
| | R2 | 1 | 1 | 3 | 3 | 7 | 7 | 5 | 5 | 1 | 1 | 3 | 3 | 7 | 7 | 5 | 5 |

TABLE 48

| | | | | | | | | Current State | | | | | | | | |
|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | | 0 | 1 | 2 | 3 | 15 | 14 | 13 | 12 | 4 | 5 | 6 | 7 | 11 | 10 | 9 | 8 |
| 1 | | 4 | 5 | 6 | 7 | 11 | 10 | 9 | 8 | 0 | 1 | 2 | 3 | 15 | 14 | 13 | 12 |

Meanwhile, the state values of the registers D0 and D1 additionally used to generate robust data are not changed when normal data are inputted. The output signals based on input and the subsequent state are as shown in Tables 3 and 4, respectively.

When ¼ rate robust data which are 16-state trellis coded are generated in the present embodiment, a trellis decoder and a signal level determiner can be designed based on the Tables 47 and 48 to thereby improve the performance of the receiver.

The structure of FIG. 24 also has a case where the positions of the registers D0 and D1 are switched with each other, just as the structures of FIGS. 14 and 15. When the positions of the registers D0 and D1 are switched in FIG. 24, the characteristics can be described based on the following Tables 49 and 50.

TABLE 49

| | | | | | | | | Current State | | | | | | | | |
|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | R1 | −7 | −5 | −7 | −5 | −7 | −5 | −7 | −5 | −3 | −1 | −3 | −1 | −3 | −1 | −3 | −1 |
|   | R2 | −7 | −7 | −5 | −5 | −7 | −7 | −5 | −5 | −1 | −1 | −3 | −3 | −1 | −1 | −3 | −3 |
| 1 | R1 | 1 | 3 | 1 | 3 | 1 | 3 | 1 | 3 | 5 | 7 | 5 | 7 | 5 | 7 | 5 | 7 |
|   | R2 | 1 | 1 | 3 | 3 | 1 | 1 | 3 | 3 | 7 | 7 | 5 | 5 | 7 | 7 | 5 | 5 |

TABLE 50

| | | | | | | | | Current State | | | | | | | | |
|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | | 0 | 1 | 2 | 3 | 8 | 9 | 10 | 11 | 15 | 14 | 13 | 12 | 7 | 6 | 5 | 4 |
| 1 | | 8 | 9 | 10 | 11 | 0 | 1 | 2 | 3 | 7 | 6 | 5 | 4 | 15 | 14 | 13 | 12 |

Figure 25:
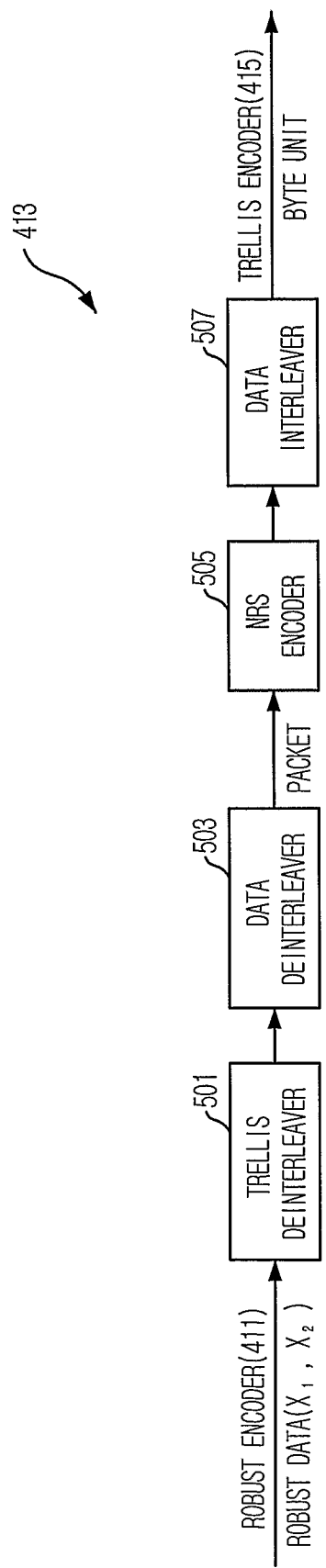
FIG. 25 is a block diagram describing a robust data processor of FIG. 4.

FIG. 25 is a block diagram describing a robust data processor of FIG. 4. As illustrated, the robust data processor 413 includes a trellis deinterleaver 2501, a data deinterleaver 2503, an RS encoder 2505, and a data interleaver 2507. The robust data $X_1$ and $X_2$ and a robust data flag which are outputted from the robust encoder 411 go through trellis deinterleaving and data deinterleaving in the trellis deinterleaver 2501 and the data deinterleaver 2503 and reassembled in the form of a packet.

As described above, 20-byte arbitrary information is added to the 207-byte data block generated in the packet formatter 503, and the RS encoder 2505 replaces the 20-byte arbitrary information with RS parity information. The robust data packet with the RS parity information therein is interleaved in the data interleaver 2507 and outputted to the trellis encoder 415 on a byte basis.

Referring to FIG. 4 again, in the second multiplexer 417, normal data and robust data are combined with a segment synchronization bit sequence and a field synchronization bit sequence, which are transmitted from a synchronization unit (not shown), to thereby generate a transmission data frame. Subsequently, a pilot signal is added in the pilot adder. A symbol stream is modulated into VSB-suppressed carrier in a VSB modulator. An 8-VSB symbol stream of a baseband is converted into a radio frequency signal in an RF converter after all and transmitted.

Figure 26:
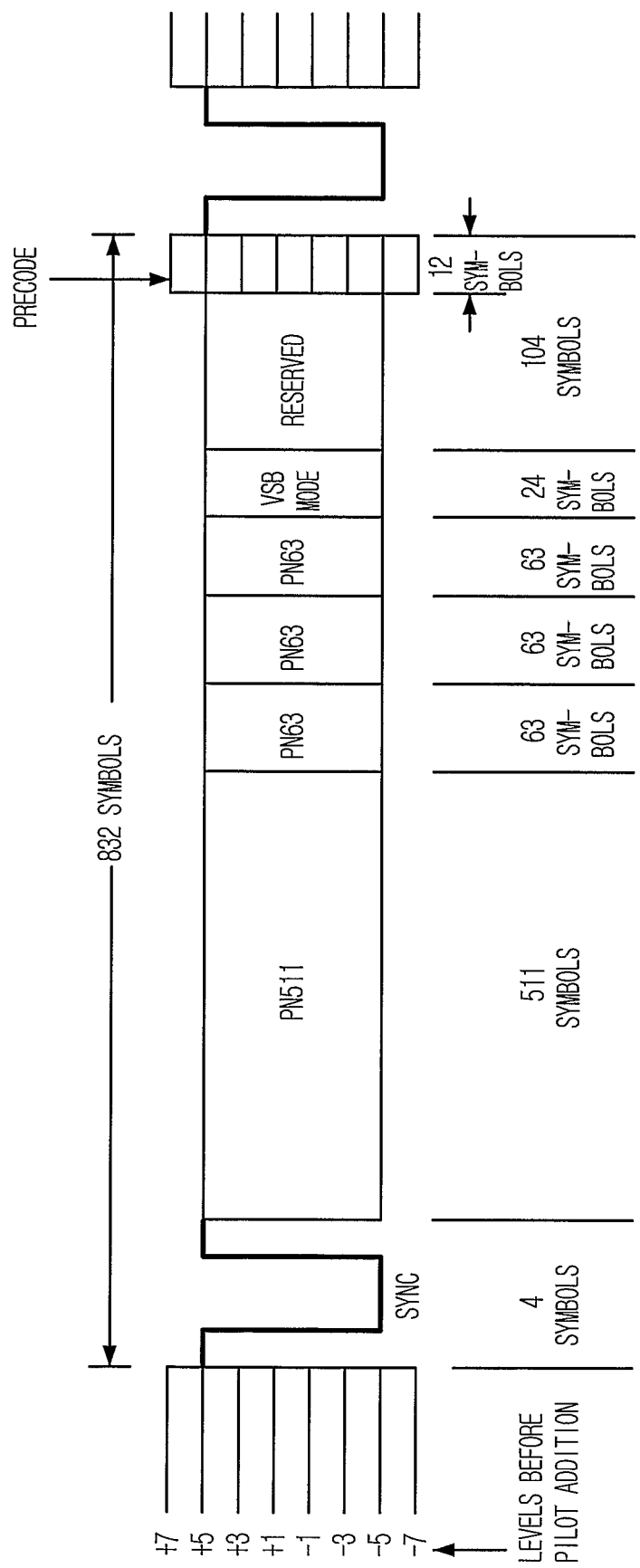
FIG. 26 is a diagram showing a field synchronous segment of a data frame transmitted by the transmitter of FIG. 4.

FIG. 26 is a diagram showing a field synchronous segment of a data frame transmitted by the transmitter of FIG. 4. As shown in the drawing, a segment transmitted from the transmitter 400 is basically the same as the segment of the ATSC A/53 Standards. If any, in a reserved area corresponding to the last 104 symbols of a segment, 92 symbols except precode 12 symbols contains information for restoring the robust data packet. The information for restoring the robust data packet includes an NRP (refer to equation 1), which is a ratio of robust data to normal data in a field, a coding rate of the robust data, e.g., ½ or ¼, and a robust data coding method. As to be described later, a receiver suggested in the embodiment of the present invention generates a robust data flag out of the information for restoring the robust data packet, and constitutional elements of the receiver can check out whether currently processed data are robust data or not by using the robust data flag.

Figure 27:
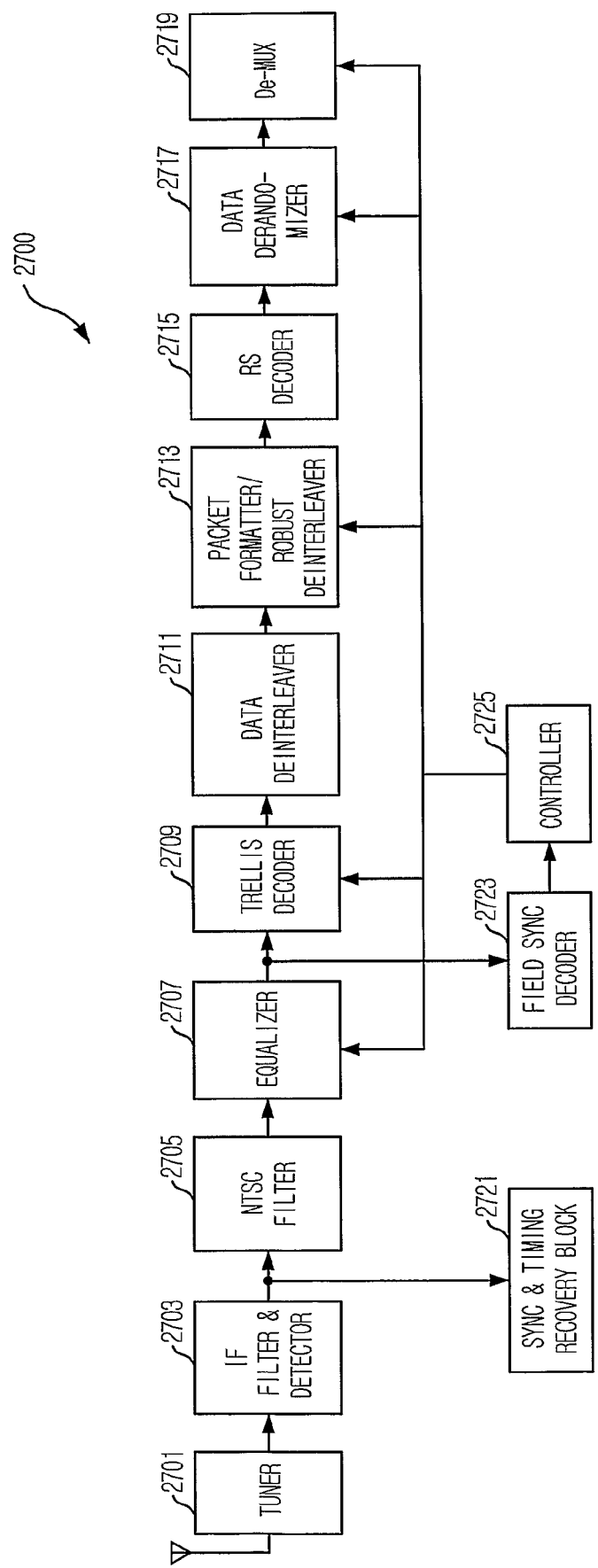
FIG. 27 is a block diagram illustrating a DTV receiver in accordance with an embodiment of the present invention.

FIG. 27 is a block diagram illustrating a DTV receiver in accordance with an embodiment of the present invention. As shown, a receiver 2700 includes a tuner 2701, an IF filter and detector 2703, an NTSC filter 2705, an equalizer 2707, a trellis decoder 2709, a data deinterleaver 2711, a packet formatter/robust deinterleaver 2713, an RS decoder 2715, a data derandomizer 2717, a demultiplexer 2719, a synch and timing recovery block 2721, a field synch decoder 2723, and a controller 2725.

The tuner 2701, the IF filter and detector 2703, the NTSC filter 2705, the data deinterleaver 2711, the RS decoder 2715, the synch and timing recovery block 2721 perform the same functions as the tuner 201, the IF filter and detector 203, the NTSC filter 205, the data deinterleaver 211, the RS decoder 213, and the synch and timing recovery block 215.

The field synch decoder 2723 receives a segment of a data frame illustrated in FIG. 26, restores the robust data packet restoring information in the reserved area, which includes information on the ratio of robust data to normal data in a field, information on the coding rate of the robust data, and information on a robust data coding method, and transmits it to the controller 2725.

Figure 28:
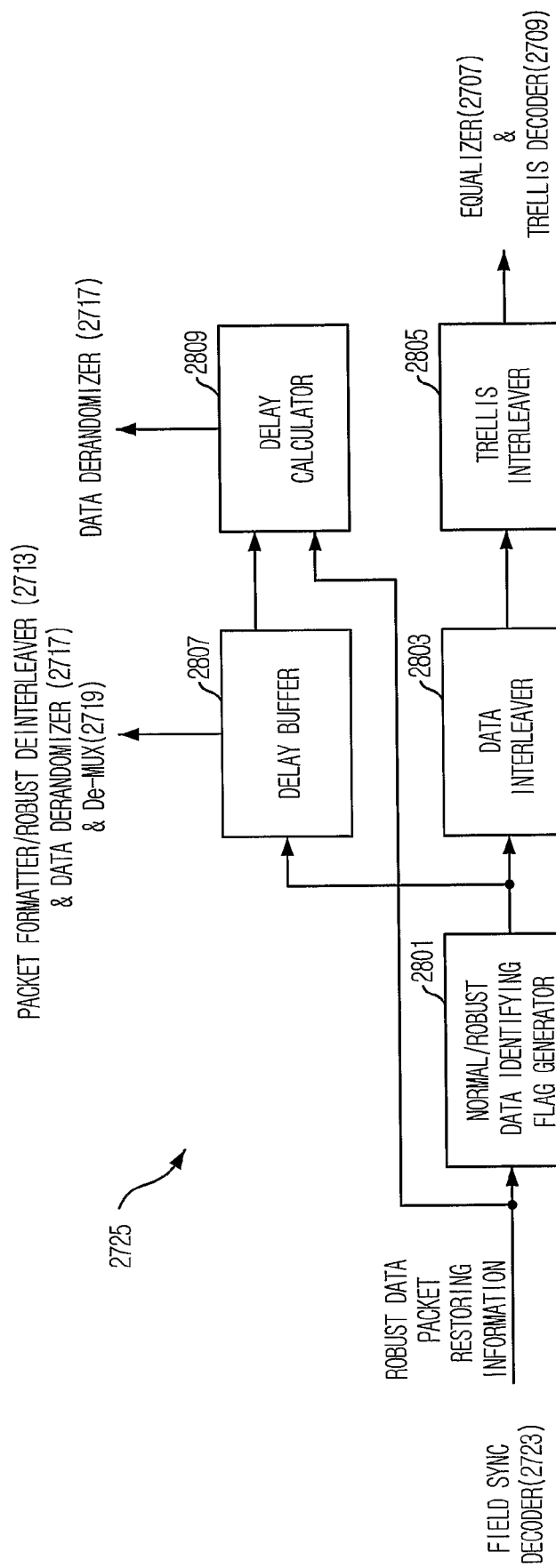
FIG. 28 is a block diagram showing a controller of FIG. 27.

FIG. 28 is a block diagram showing a controller of FIG. 27. As shown, the controller 2725 includes a normal/robust data identifying flag generator 2801, a data interleaver 2803, a trellis interleaver 2805, a delay buffer 2807, and a delay calculator 2809.

The normal/robust data identifying flag generator 2801 generates a robust data flag by using the robust data packet restoring information transmitted from the field synch decoder 2723.

The generated robust data flag goes through a bit-unit data interleaving and trellis interleaving based on the ATSC A/53 in the data interleaver 2803 and the trellis interleaver 2805 and the interleaved robust data flag is transmitted to the equalizer 2707 and the trellis decoder 2709. The robust data flag included in the data frame transmitted from the transmitter 400 is already interleaved through the data interleaving and the trellis interleaving, the equalizer 2707 and the trellis decoder 2709 performs equalization and trellis decoding based on the interleaved robust data flag obtained from the data interleaving and the trellis interleaving.

Meanwhile, the delay buffer 2807 receives the robust data flag generated in the normal/robust data identifying flag generator 2801 and transmits the robust data flag to the packet formatter/robust deinterleaver 2713 in consideration of delay generated while data are processed in the trellis decoder 2709 and the data deinterleaver 2711. Also, the delay buffer 2807 transmits the robust data flag to the data derandomizer 2717, the demultiplexer 2719, and the delay calculator 2809, individually, in consideration of delay generated while data are processed in the packet formatter/robust deinterleaver 2713.

The delay calculator 2809 calculates delay time of a robust data packet by using the robust data flag, which is obtained in consideration of delay with respect to normal data generated while robust data are processed in the packet formatter/robust deinterleaver 2713 and transmitted from the delay buffer 2807, and the robust data packet restoring information, which is transmitted from the field synch decoder 2723, and transmits the calculated delay time to the data derandomizer 2717.

The data derandomizer 2717 is synchronized with a field synchronous signal of a data frame and performs derandomization. The robust data packet restoring information transmitted from the field synch decoder 2723 includes information on the position of the robust data packet in the data frame. However, the packet formatter/robust deinterleaver 2713 can process only a robust data packet and, particularly, the deinterleaving process carried out in the robust deinterleaver delays the robust data packet by a few packets.

The delay calculator 2809 calculates delay time with respect to the robust data packet based on the received robust data packet restoring information and the robust data flag to compensate for the delay with respect to the robust data packet and transmits the delay time to the data derandomizer 2717. The data derandomizer 2717 derandomizes a normal data packet and a robust data packet based on the received robust data flag and the delay time with respect to the robust data packet.

For example, when the $n^{th}$ normal data packet is derandomized, the next robust data packet to be derandomized is not the $(n+1)^{th}$ robust data packet but it can be the $k^{th}$ robust data packet ($k<n$). The delay of the robust data packet is longer than that of the normal data packet, because the delay caused by restoring the original packet in the packet formatter/robust deinterleaver 2713 is included. Therefore, the data derandomizer 2717 should perform the derandomization in consideration of the delay.

Figure 29:
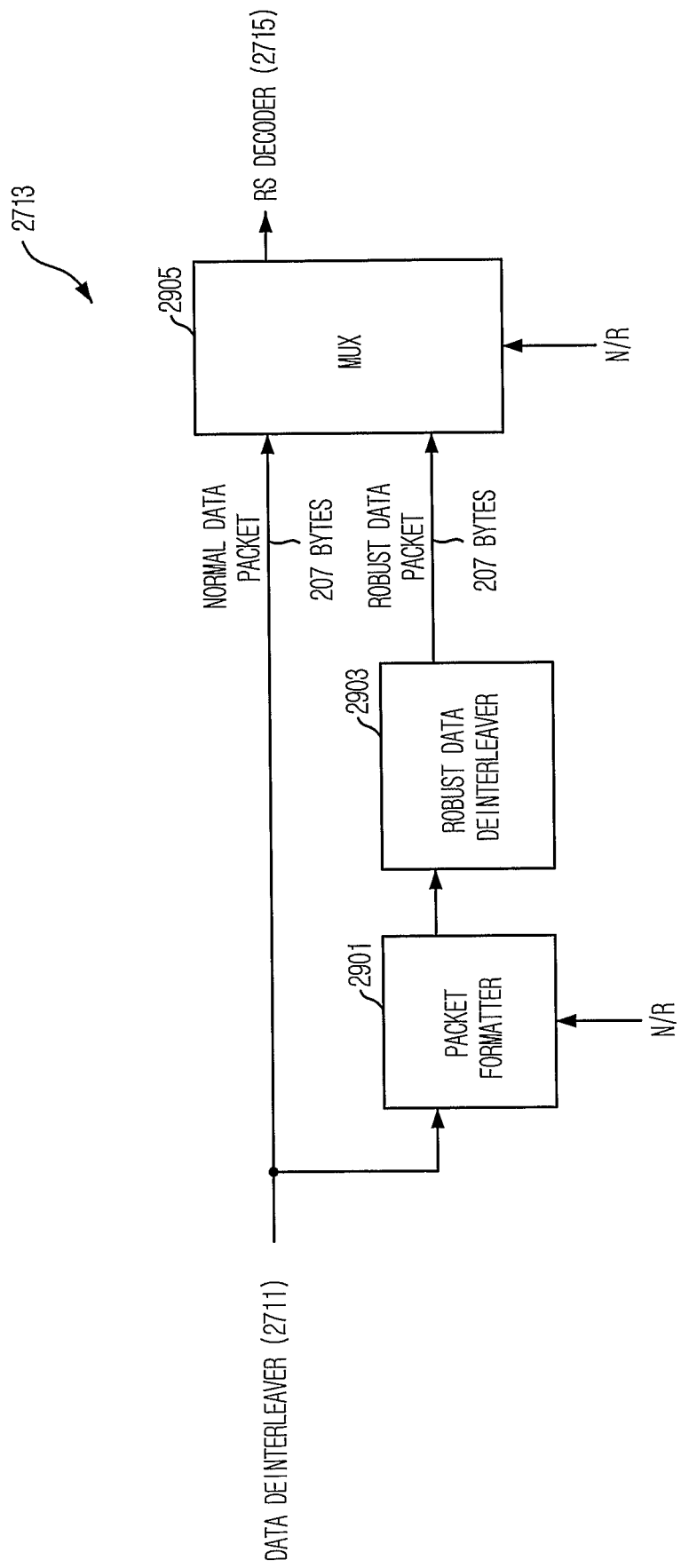
FIG. 29 is a block diagram describing a packet formatter and a robust deinterleaver of FIG. 27.
Figure 30:
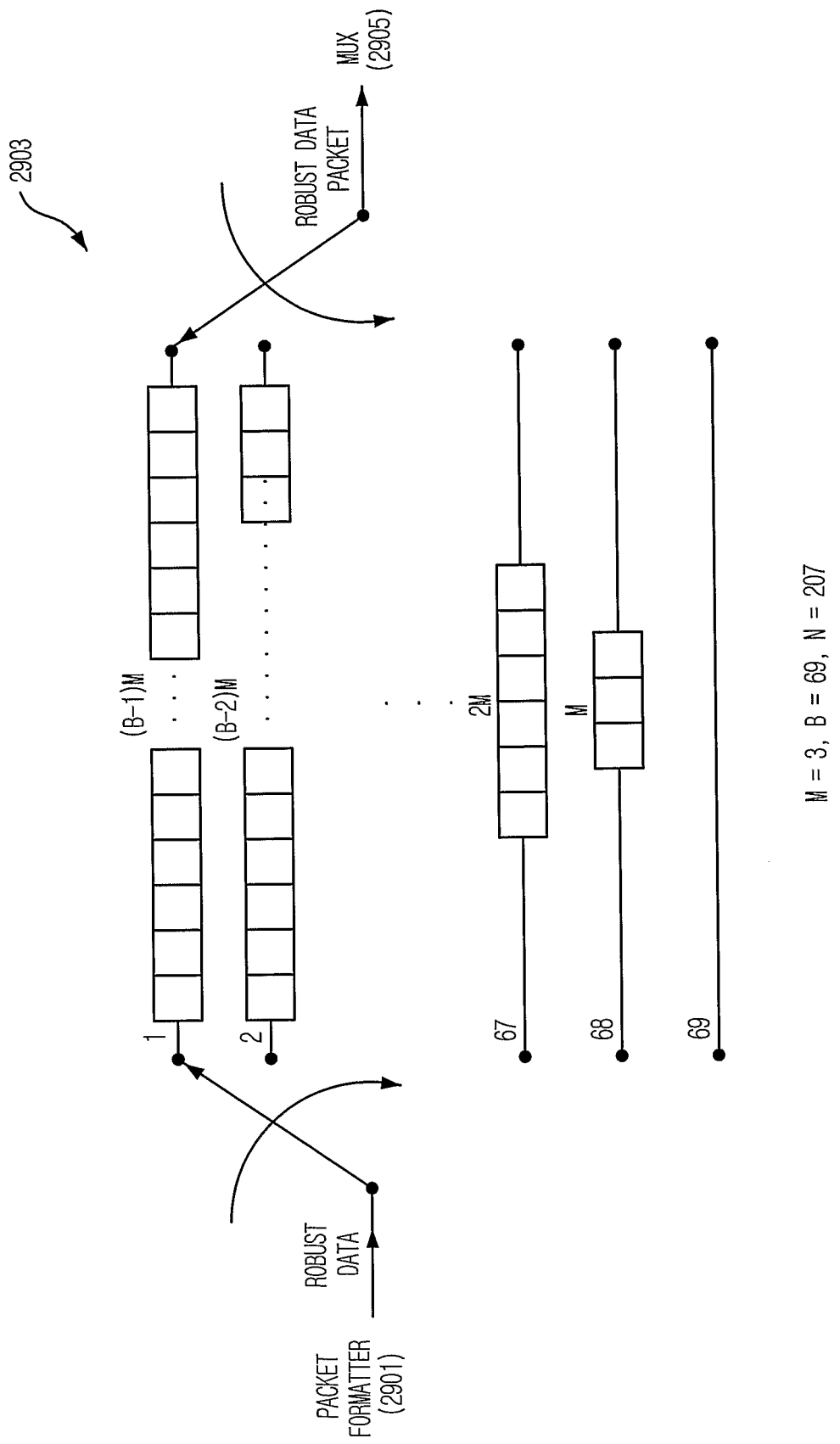
FIG. 30 is a diagram illustrating a robust data deinterleaver of FIG. 29.

FIG. 29 is a block diagram describing a packet formatter and a robust deinterleaver of FIG. 27, and FIG. 30 is a diagram illustrating a robust data deinterleaver of FIG. 29. The packet formatter and a robust data deinterleaver are operated in opposite to the robust interleaver/packet formatter 407 of the transmitter 400 illustrated in FIG. 5. That is, it removes RS parity (20 bytes) and header bytes (3 bytes) included in the robust data segment (207 bytes) inputted from the data deinterleaver 2711 and generates robust data packets including information data and null packets. Thus, when a robust data segment having 9 packets (9×207 bytes) is inputted into a packet formatter 2901, the packet formatter 2901 outputs four robust data packets which are formed of information data and five null packets formed of null data. Subsequently, a robust data deinterleaver 2903 receives the robust data packets inputted from the packet formatter 2901 on a byte basis, performs deinterleaving, and transmits the robust data packets to a multiplexer 2905. During the deinterleaving, null packets among the robust data packets are abandoned and the deinterleaving is carried out only on information packets. A normal data packet has a predetermined delay to be thereby multiplexed with a robust data packet.

The multiplexed normal data packet and robust data packet are transmitted to the RS decoder 2715. The RS decoder 2715 performs RS decoding with respect to each packet and transmits the resultant to the data derandomizer 2717.

With reference to FIG. 25 again, the demultiplexer 2719 demultiplexes the normal data packet and the robust data packet based on the robust data flag and outputs them in a form of a serial data stream formed of a 188-byte MPEG compatible data packet.

For the equalizer 2707, a known determiner, which is known as a slicer, or a trellis decoder with a trace back of zero (0) is used. The equalizer 2707 equalizes a received signal based on the interleaved robust data flag obtained from the bit-unit data interleaving and the trellis interleaving based on the ATSC A/53 and transmitted from the controller 2725. The signal level of normal data is determined from the 8 levels of $\{-7,-5,-3,-1,1,3,5,7\}$ as it used to be conventionally, and the signal level of robust data is determined from 4 or 8 levels of $\{-7,-5,5,7\}$, $\{-7,-1,3,5\}$, $\{-5,-3,1,7\}$ and $\{-7,-5,-3,-1,1,3,5,7\}$ according to the coding method in the robust encoder 411 of the transmitter 400.

A robust data signal can be used as decision data used to update a tap coefficient of the equalizer 2707. Since precise signal level determination increases a convergence speed of the equalizer, it can improve reception performance for robust data as well as normal data in a Doppler environment.

With respect to a normal data signal, the trellis decoder 2709 performs trellis decoding on an 8-level signal $\{-7,-5,-3,-1,1,3,5,7\}$, which is the same as the conventional technology. With respect to a robust data signal, it performs trellis decoding inversely according to the P-2VSB, E-4VSB or E-8VSB coding method used in the robust encoder 411 of the transmitter 400.

The trellis decoder 2709 generates one-bit information out of two symbols. For example, when determined signal levels are (5,5) and (7,7) sequentially in FIG. 14, the trellis decoder 2709 confirms that corresponding informations are 0 and 1 by performing the trellis decoding based on the Table 1 and 2.

According to the present invention, the 8-VSB receiver based on the ATSC A/53 can receive a normal data packet and it can provide backward compatibility by processing a robust data packet as a null packet.

While the present invention has been described with respect to certain preferred embodiments, it will be apparent to those skilled in the art that various changes and modifications may be made without departing from the scope of the invention as defined in the following claims.

INDUSTRIAL APPLICABILITY

The technology of the present invention can be applied to a DTV transmission/reception system.

What is claimed is:

1. A digital television (DTV) transmitter, comprising:
an input means for receiving a digital video data stream including normal data and robust data;
an encoding means for performing ¼ rate coding on the digital video data stream so that one bit can be transmitted through two symbols of a first symbol R1 and a second symbol R2, and
a transmitting means for modulating and transmitting an output signal of the encoding means,
wherein the encoding means performs ¼ rate coding and maps the first symbol R1 and the second symbol R2 to one symbol of {−7,−5,−3,−1,1,3,5,7}, respectively.

2. The DTV transmitter as recited in claim 1, wherein the encoding means includes a plurality of multiplexers and generates the first symbol R1 and the second symbol R2 sequentially with respect to one-bit robust data by a control bit for multiplexers.

3. The DTV transmitter as recited in claim 1, wherein the encoding means performs ¼ rate coding based on an E-4VSB method and maps the first symbol R1 to one symbol of {−7,−1,3,5} and the second symbol R2 to one symbol of {−5,−3,1,7}.

4. The DTV transmitter as recited in claim 1, wherein the encoding means performs ¼ rate coding based on an E-4VSB method and maps the first symbol R1 to one symbol of {−5,−3,1,7} and the second symbol R2 to one symbol of {−7,−1,3,5}.

5. The DTV transmitter as recited in claim 2, wherein the encoding means performs ¼ rate coding by using four registers.

6. The DTV transmitter as recited in claim 5, wherein the encoding means includes:
a robust encoder for coding the one-bit robust data into two-bit data according to the state of two registers D0 and D1; and
a trellis encoder for performing standard trellis coding on the two-bit data and outputting the symbols R1 and R2 having one level respectively among predetermined levels expressed in three bits Z2, Z1 and Z0 according to the state of two registers D2 and D3, and
the state (S) of the encoding means is determined based on an equation expressed as: S=D0×8+D1×4+D2×2+D3.

7. The DTV transmitter as recited in claim 6, wherein values of the registers D0 and D1 of the robust encoder can be changed when the robust encoder generates the first symbol R1, and the values are maintained when the robust encoder generates the second symbol R2.

8. The DTV transmitter as recited in claim 7, wherein, when the robust data are inputted, the encoding means codes the robust data so that the output symbols R1 and R2 and the subsequent state are as shown in Tables 7 and 8:

TABLE 7

| | | Current State | | | | | | | | | | | | | | | |
|---|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | 5 | 3 | 5 | 3 | −7 | −1 | −7 | −1 | 5 | 3 | 5 | 3 |
| | R2 | −3 | −5 | −5 | −3 | 7 | 1 | 1 | 7 | 1 | 7 | 7 | 1 | −5 | −3 | −3 | −5 |
| 1 | R1 | 5 | 3 | 5 | 3 | −7 | −1 | −7 | −1 | 5 | 3 | 5 | 3 | −7 | −1 | −7 | −1 |
| | R2 | 7 | 1 | 1 | 7 | −3 | −5 | −5 | −3 | −5 | −3 | −3 | −5 | 1 | 7 | 7 | 1 |

TABLE 8

| | Current State | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| 0 | 1 | 3 | 2 | 0 | 3 | 1 | 0 | 2 | 4 | 6 | 7 | 5 | 6 | 4 | 5 | 7 |
| 1 | 11 | 9 | 8 | 10 | 9 | 11 | 10 | 8 | 14 | 12 | 13 | 15 | 12 | 14 | 15 | 13. |

9. The DTV transmitter as recited in claim 7, wherein, when the robust data are inputted, the encoding means codes the robust data so that the output symbols R1 and R2 and the subsequent state are as shown in Tables 9 and 10:

TABLE 9

| | | Current State | | | | | | | | | | | | | | | |
|---|---|---|---|---|---|---|---|---|---|---|---|---|---|---|---|---|---|
| Input | | 0 | 1 | 2 | 3 | 4 | 5 | 6 | 7 | 8 | 9 | 10 | 11 | 12 | 13 | 14 | 15 |
| 0 | R1 | −3 | −5 | −3 | −5 | 1 | 7 | 1 | 7 | −3 | −5 | −3 | −5 | 1 | 7 | 1 | 7 |
| | R2 | −1 | −7 | −7 | −1 | 5 | 3 | 3 | 5 | 3 | 5 | 5 | 3 | −7 | −1 | −1 | −7 |
| 1 | R1 | 1 | 7 | 1 | 7 | −3 | −5 | −3 | −5 | 1 | 7 | 1 | 7 | −3 | −5 | −3 | −5 |
| | R2 | 5 | 3 | 3 | 5 | −1 | −7 | −7 | −1 | −7 | −1 | −1 | −7 | 3 | 5 | 5 | 3 |

TABLE 10

| Input | \multicolumn{16}{c}{Current State} |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 3 | 1 | 0 | 2 | 1 | 3 | 2 | 0 | 6 | 4 | 5 | 7 | 4 | 6 | 7 | 5 |
| 1 | 9 | 11 | 10 | 8 | 11 | 9 | 8 | 10 | 12 | 14 | 15 | 13 | 14 | 12 | 13 | 15. |

10. The DTV transmitter as recited in claim 7, wherein, when the robust data are inputted, the encoding means codes the robust data so that the output symbols R1 and R2 and subsequent state are as shown in Tables 11 and 12:

TABLE 11

| Input | | \multicolumn{16}{c}{Current State} |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −5 | −7 | −5 | 1 | 3 | 1 | 3 | −3 | −1 | −3 | −1 | 5 | 7 | 5 | 7 |
|   | R2 | −7 | −7 | −5 | −5 | 1 | 1 | 3 | 3 | −1 | −1 | −3 | −3 | 7 | 7 | 5 | 5 |
| 1 | R1 | 1 | 3 | 1 | 3 | −7 | −5 | −7 | −5 | 5 | 7 | 5 | 7 | −3 | −1 | −3 | −1 |
|   | R2 | 1 | 1 | 3 | 3 | −7 | −7 | −5 | −5 | 7 | 7 | 5 | 5 | −1 | −1 | −3 | −3 |

TABLE 12

| Input | \multicolumn{16}{c}{Current State} |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 0 | 1 | 2 | 3 | 7 | 6 | 5 | 4 | 7 | 6 | 5 | 4 |
| 1 | 12 | 13 | 14 | 15 | 12 | 13 | 14 | 15 | 11 | 10 | 9 | 8 | 11 | 10 | 9 | 8. |

11. The DTV transmitter as recited in claim 6, wherein the encoding means further includes:
  a data randomizer for randomizing an output signal of the input means;
  a Reed Solomon (RS) encoder for performing RS encoding on output signals of the data randomizer;
  a robust interleaver/packet formatter for interleaving robust data among output signals of the RS encoder and performing reconstruction into robust data packets based on a robust data coding rate; and
  a data interleaver for interleaving an output signal of the robust interleaver/packet formatter.

12. A digital television (DTV) receiver, comprising:
  a receiving means for receiving a transmission signal including normal data and robust data and converting the received transmission signal into a baseband signal;
  an equalizing means for determining a symbol level of the transmission signal;
  a trellis decoding means for performing trellis decoding on the symbol whose level has been determined; and
  a decoding means for outputting a digital video data stream with respect to the trellis decoded signal,
  wherein the trellis decoding means performs ¼ rate decoding on the robust data so that one bit can be extracted with respect to two symbols of a first symbol R1 and a second symbol R2, wherein the trellis decoding means performs the trellis decoding on the symbol level of {−7, −5, −3, −1, 1, 3, 5, 7}.

13. The DTV receiver as recited in claim 12, wherein the equalizing means adopts an E-4VSB method and determines the levels of the first and second symbols R1 and R2 based on {−7,−1,3,5} and {−5,−3,1,7}, respectively.

14. The DTV receiver as recited in claim 12, wherein the equalizing means adopts an E-4VSB method and determines the levels of the first and second symbols R1 and R2 based on {−5,−3,1,7} and {−7,−1,3,5}, respectively.

15. The DTV receiver as recited in claim 12, wherein
  the trellis decoding means decodes the first and second symbols R1 and R2 based on Tables 19 and 20 showing symbol levels and subsequent state, which are expressed as:

TABLE 19

| Input | | \multicolumn{16}{c}{Current State} |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | 5 | 3 | 5 | 3 | −7 | −1 | −7 | −1 | 5 | 3 | 5 | 3 |
|   | R2 | −3 | −5 | −5 | −3 | 7 | 1 | 1 | 7 | 1 | 7 | 7 | 1 | −5 | −3 | −3 | −5 |
| 1 | R1 | 5 | 3 | 5 | 3 | −7 | −1 | −7 | −1 | 5 | 3 | 5 | 3 | −7 | −1 | −7 | −1 |
|   | R2 | 7 | 1 | 1 | 7 | −3 | −5 | −5 | −3 | −5 | −3 | −3 | −5 | 1 | 7 | 7 | 1 |

TABLE 20

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 1 | 3 | 2 | 0 | 3 | 1 | 0 | 2 | 4 | 6 | 7 | 5 | 6 | 4 | 5 | 7 |
| 1 | 11 | 9 | 8 | 10 | 9 | 11 | 10 | 8 | 14 | 12 | 13 | 15 | 12 | 14 | 15 | 13. |

16. The DTV receiver as recited in claim 12, wherein the trellis decoding means decodes the first and second symbols R1 and R2 based on Tables 21 and 22 showing symbol levels and subsequent state, which are expressed as:

TABLE 21

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | -3 | -5 | -3 | -5 | 1 | 7 | 1 | 7 | -3 | -5 | -3 | -5 | 1 | 7 | 1 | 7 |
| | R2 | -1 | -7 | -7 | -1 | 5 | 3 | 3 | 5 | 3 | 5 | 5 | 3 | -7 | -1 | -1 | -7 |
| 1 | R1 | 1 | 7 | 1 | 7 | -3 | -5 | -3 | -5 | 1 | 7 | 1 | 7 | -3 | -5 | -3 | -5 |
| | R2 | 5 | 3 | 3 | 5 | -1 | -7 | -7 | -1 | -7 | -1 | -1 | -7 | 3 | 5 | 5 | 3 |

TABLE 22

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 3 | 1 | 0 | 2 | 1 | 3 | 2 | 0 | 6 | 4 | 5 | 7 | 4 | 6 | 7 | 5 |
| 1 | 9 | 11 | 10 | 8 | 11 | 9 | 8 | 10 | 12 | 14 | 15 | 13 | 14 | 12 | 13 | 15. |

17. The DTV receiver as recited in claim 12, wherein the decoding means includes:
  a data deinterleaver for deinterleaving an output signal of the trellis decoding means;
  a packet formatter/robust deinterleaver for re-constructing robust data among the output signals of the data deinterleaver into robust data packets formed of information data and deinterleaving the re-constructed robust data packets; and
  a Reed Solomon (RS) decoder for performing RS decoding on output signals of the packet formatter/robust deinterleaver;
  a data derandomizer for derandomizing output signals of the RS decoder; and
  a demultiplexer for demultiplexing output signals of the data derandomizer.

18. A digital television (DTV) transmitting method, comprising the steps of:
  a) receiving a digital video data stream including normal data and robust data;
  b) performing ¼ rate coding on the digital video data stream so that one bit is transmitted through two symbols of first and second symbols R1 and R2; and
  c) modulating and transmitting output signals of the coding step b),
  wherein the first symbol R1 and the second symbol R2 are respectively mapped to one symbol of {-7,-5,-3,-1,1,3,5,7} by performing the ¼ rate coding.

19. The DTV transmitting method as recited in claim 18, wherein the first and second symbols R1 and R2 are generated sequentially with respect to one-bit robust data by a control bit for multiplexers in the step b).

20. The DTV transmitting method as recited in claim 18 wherein the first symbol R1 is mapped to one symbol among {-7,-1,3,5} and the second symbol R2 is mapped to one symbol among {-5,-3,1,7} in the step b) by adopting an E-4VSB method and performing ¼ rate coding.

21. The DTV transmitting method as recited in claim 18 wherein the first symbol R1 is mapped to one symbol among {-5,-3,1,7} and the second symbol R2 is mapped to one symbol among {-7,-1,3,5} in the step b) by adopting an E-4VSB method and performing ¼ rate coding.

22. The DTV transmitting method as recited in claim 19, wherein ¼ rate coding is carried out by using four registers; and
  c) modulating and transmitting output signals of the coding step b) in the step b).

23. The DTV transmitting method as recited in claim 22 wherein the step b) includes the steps of:
  b1) coding the one-bit robust data into two-bit data according to the state of two registers D0 and D1; and
  b2) performing trellis coding where the two-bit data are outputted as the symbols R1 and R2 having one level respectively among predetermined levels expressed in three bits Z2, Z1 and Z0.

24. The DTV transmitting method as recited in claim 23, wherein values of the registers D0 and D1 used in the step b1) can be changed when the first symbol R1 is generated, and the values are maintained when the second symbol R2 is generated.

25. The DTV transmitting method as recited in claim 23, wherein, when the robust data are inputted, the robust data are coded in such a manner that the output symbols R1 and R2 and subsequent state are as shown in Tables 31 and 32:

TABLE 31

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | 5 | 3 | 5 | 3 | −7 | −1 | −7 | −1 | 5 | 3 | 5 | 3 |
| | R2 | −3 | −5 | −5 | −3 | 7 | 1 | 1 | 7 | 1 | 7 | 7 | 1 | −5 | −3 | −3 | −5 |
| 1 | R1 | 5 | 3 | 5 | 3 | −7 | −1 | −7 | −1 | 5 | 3 | 5 | 3 | −7 | −1 | −7 | −1 |
| | R2 | 7 | 1 | 1 | 7 | −3 | −5 | −5 | −3 | −5 | −3 | −3 | −5 | 1 | 7 | 7 | 1 |

TABLE 32

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 1 | 3 | 2 | 0 | 3 | 1 | 0 | 2 | 4 | 6 | 7 | 5 | 6 | 4 | 5 | 7 |
| 1 | 11 | 9 | 8 | 10 | 9 | 11 | 10 | 8 | 14 | 12 | 13 | 15 | 12 | 14 | 15 | 13. |

26. The DTV transmitting method as recited in claim 23, wherein, when the robust data are inputted, the robust data are coded in such a manner that the output symbols R1 and R2 and subsequent state are as shown in Tables 33 and 34:

TABLE 33

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −3 | −5 | −3 | −5 | 1 | 7 | 1 | 7 | −3 | −5 | −3 | −5 | 1 | 7 | 1 | 7 |
| | R2 | −1 | −7 | −7 | −1 | 5 | 3 | 3 | 5 | 3 | 5 | 5 | 3 | −7 | −1 | −1 | −7 |
| 1 | R1 | 1 | 7 | 1 | 7 | −3 | −5 | −3 | −5 | 1 | 7 | 1 | 7 | −3 | −5 | −3 | −5 |
| | R2 | 5 | 3 | 3 | 5 | −1 | −7 | −7 | −1 | −7 | −1 | −1 | −7 | 3 | 5 | 5 | 3 |

TABLE 34

| Input | Current State | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 3 | 1 | 0 | 2 | 1 | 3 | 2 | 0 | 6 | 4 | 5 | 7 | 4 | 6 | 7 | 5 |
| 1 | 9 | 11 | 10 | 8 | 11 | 9 | 8 | 10 | 12 | 14 | 15 | 13 | 14 | 12 | 13 | 15. |

27. A digital television (DTV) receiving method, comprising the steps of:
   a) receiving a transmission signal including normal data and robust data and converting the received transmission signal into a baseband signal;
   b) determining a symbol level of the transmission signal, which is called equalization;
   c) performing trellis decoding on the symbol whose level has been determined; and
   d) outputting a digital video data stream with respect to the trellis decoded signal, wherein ¼ rate decoding is performed on the robust data in the trellis decoding step c) in such a manner that one bit is extracted for two symbols of a first symbol R1 and a second symbol R2,
      wherein the trellis decoding is performed on the symbol level of {−7,−5,−3,−1,1,3,5,7}.

28. The DTV receiving method as recited in claim 27 wherein a E-4VSB method is adopted and levels of the first and second symbols R1 and R2 are determined in the step b) based on {−7,−1,3,5} and {−5,−3,1,7}, respectively.

29. The DTV receiving method as recited in claim 27, wherein a E-4VSB method is adopted and levels of the first and second symbols R1 and R2 are determined in the step b) based on {−5,−3,1,7} and {−7,−1,3,5}, respectively.

30. The DTV receiving method as recited in claim 27 wherein the first symbol R1 and the second symbol R2 are decoded in the trellis decoding step c) based on Tables 43 and 44 showing symbol levels and subsequent state:

TABLE 43

| Input | | Current State | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | R1 | −7 | −1 | −7 | −1 | 5 | 3 | 5 | 3 | −7 | −1 | −7 | −1 | 5 | 3 | 5 | 3 |
| | R2 | −3 | −5 | −5 | −3 | 7 | 1 | 1 | 7 | 1 | 7 | 7 | 1 | −5 | −3 | −3 | −5 |
| 1 | R1 | 5 | 3 | 5 | 3 | −7 | −1 | −7 | −1 | 5 | 3 | 5 | 3 | −7 | −1 | −7 | −1 |
| | R2 | 7 | 1 | 1 | 7 | −3 | −5 | −5 | −3 | −5 | −3 | −3 | −5 | 1 | 7 | 7 | 1 |

TABLE 44

| Input | \multicolumn{16}{c}{Current State} |
|---|---|

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 3 | 2 | 0 | 3 | 1 | 0 | 2 | 4 | 6 | 7 | 5 | 6 | 4 | 5 | 7 |
| 1 | 11 | 9 | 8 | 10 | 9 | 11 | 10 | 8 | 14 | 12 | 13 | 15 | 12 | 14 | 15 | 13 |

31. The DTV receiving method as recited in claim 27 wherein the first symbol R1 and the second symbol R2 are decoded in the trellis decoding step c) based on Tables 45 and 46 showing symbol levels and subsequent state:

TABLE 45

| Input | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | R1 | -3 | -5 | -3 | -5 | 1 | 7 | 1 | 7 | -3 | -5 | -3 | -5 | 1 | 7 | 1 | 7 |
|   | R2 | -1 | -7 | -7 | -1 | 5 | 3 | 3 | 5 | 3 | 5 | 5 | 3 | -7 | -1 | -1 | -7 |
| 1 | R1 | 1 | 7 | 1 | 7 | -3 | -5 | -3 | -5 | 1 | 7 | 1 | 7 | -3 | -5 | -3 | -5 |
|   | R2 | 5 | 3 | 3 | 5 | -1 | -7 | -7 | -1 | -7 | -1 | -1 | -7 | 3 | 5 | 5 | 3 |

TABLE 46

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | 3 | 1 | 0 | 2 | 1 | 3 | 2 | 0 | 6 | 4 | 5 | 7 | 4 | 6 | 7 | 5 |
| 1 | 9 | 11 | 10 | 8 | 11 | 9 | 8 | 10 | 12 | 14 | 15 | 13 | 14 | 12 | 13 | 15 |

32. The DTV receiving method as recited in claim 27, wherein the decoding step d) includes the steps of:
 d1) deinterleaving output signals of the trellis decoding step c);
 d2) reconstructing robust data among output signals obtained in the data deinterleaving step d1) into robust data packets formed of information data, which is packet formatting, and deinterleaving the reconstructed robust data packets;
 d3) performing Reed Solomon (RS) decoding on output signals of the packet formatting/robust deinterleaving step d2);
 d4) derandomizing output signals of the RS decoding step d3); and
 d5) demultiplexing output signals of the data derandomizing step d4).

* * * * *